(12) United States Patent
Sensu et al.

(10) Patent No.: US 8,259,326 B2
(45) Date of Patent: Sep. 4, 2012

(54) IMAGE READOUT SYSTEM, SERVER APPARATUS, IMAGE READOUT APPARATUS, AND TERMINAL APPARATUS

(75) Inventors: Minami Sensu, Yamatokoriyama (JP); Mitsuhiro Ao, Kashihara (JP); Tsuyoshi Nagao, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1007 days.

(21) Appl. No.: 11/900,808

(22) Filed: Sep. 13, 2007

(65) Prior Publication Data

US 2008/0235303 A1   Sep. 25, 2008

(30) Foreign Application Priority Data

Sep. 14, 2006   (JP) ................................. 2006-249982

(51) Int. Cl.
G06F 3/12 (2006.01)
G06F 15/16 (2006.01)
G06F 15/173 (2006.01)
G06K 15/00 (2006.01)
G06K 9/34 (2006.01)
G06K 9/00 (2006.01)
G06K 9/46 (2006.01)
H04N 1/40 (2006.01)
H04N 1/46 (2006.01)

(52) U.S. Cl. ........ 358/1.15; 358/2.1; 358/505; 709/203; 709/217; 709/223; 382/176; 382/177; 382/181; 382/189; 382/190

(58) Field of Classification Search ........................ None
See application file for complete search history.

(56) References Cited

U.S. PATENT DOCUMENTS

| | | | | |
|---|---|---|---|---|
| 7,383,328 | B2* | 6/2008 | Iyoki | 709/222 |
| 2003/0191871 | A1* | 10/2003 | Tohki | 710/1 |
| 2004/0153516 | A1* | 8/2004 | Maekawa et al. | 709/206 |
| 2005/0063003 | A1 | 3/2005 | Mishima et al. | |
| 2005/0225794 | A1* | 10/2005 | Ono | 358/1.15 |
| 2007/0154098 | A1* | 7/2007 | Geva et al. | 382/209 |

FOREIGN PATENT DOCUMENTS

| | | |
|---|---|---|
| JP | 05-081464 | 4/1993 |
| JP | 08-315069 | 11/1996 |
| JP | 09-305075 | 11/1997 |
| JP | 10-021382 | 1/1998 |
| JP | 10-171920 | 6/1998 |
| JP | 11-110479 | 4/1999 |
| JP | 2002-150218 | 5/2002 |
| JP | 2003-036260 | 2/2003 |
| JP | 2003-274102 | 9/2003 |

* cited by examiner

*Primary Examiner* — Fan Zhang
(74) *Attorney, Agent, or Firm* — Edwards Wildman Palmer LLP; David G. Conlin; David A. Tucker

(57) ABSTRACT

An application folder associated with a client PC and an application software of the client PC is generated in a storage section of a station PC. Scan data stored in the application folder is then moved to an application data folder of the client PC, which folder corresponds to the client PC and application software associated with the application folder. As a result, in a network scanner system in which a scanner apparatus is connected to the client PC over a network, it is possible to efficiently store scan data read out by the scanner apparatus and perform data processing to the scan data by an application software.

12 Claims, 14 Drawing Sheets

FIG. 5

○○○○ ltd.
CEO

Hanako Yamada

〒000-0000  Nara city...
　　　　　　TEL 000-000-0000   FAX 000-000-0000
　　　　　　Mobile Phone Number  090-0000-0000
　　　　　　e-mail: hanako.takahashi@---.co.jp
　　　　　　URL: http://

FIG. 6

Hanako Yamada

7320 50th St. N.w.Seattle, WA  123-456-789  hanako.yamada@abc.ne.jp

| Objective | To use my knowledge of languages, computer skills and experience working with international visitors in a tourist-related industry | | |
|---|---|---|---|
| Skills | ■ Native speaker of Japanese<br><br>■ Advanced proficiency in Spanish and English<br><br>■ ..................................<br>■ ..................................<br>..................................<br>..................................<br>■ ..................................<br><br>■ ..................................<br><br>■ ..................................<br>■ .................................. | | |
| Work History | Office Assistant | AAA corporation, Seattle,WA | 2000-2002 |
|  | ... | ... | ... |
|  | ... | ... | ... |
|  | ... | ... | ... |
| Education | BA | University of Washington, Seattle, WA | 2000 |
| References | References are available on request. | | |

FIG. 7 (a)

| AUTOMATIC DETERMINATION OF FORMAT |
|---|
| IS AUTOMATIC DETERMINATION OF DOCUMENT THUS READOUT REQUIRED?  Yes  No |

FIG. 7 (b)

| SELECT CLIENT PC | BACKWARD | OK |
|---|---|---|
| PLEASE SELECT CLIENT PC BY WHICH DATA IS FETCHED. HANAKO YAMADA  ICHIRO TANAKA | | |

FIG. 7 (c)

| SELECT APPLICATION SOFTWARE | BACKWARD | OK |
|---|---|---|
| PLEASE WHICH APPLICATION SOFTWARE IS USED TO FETCH THE SCAN DATA. BUSINESS CARD FILING △△△  SEARCH ENGINE ○○○ | | |

FIG. 7 (d)

| SETTING OF SCAN CONDITIONS | BACKWARD | OK |
|---|---|---|
| COLOR MODE  BLACK AND WHITE  GRAYSCALE  FULL COLOR  RESOLUTION  400X400dpi  600X600dpi | | |

FIG. 10 (a)

| AUTOMATIC DETERMINATION OF FORMAT | | |
|---|---|---|
| IS AUTOMATIC DETERMINATION OF DOCUMENT THUS READOUT REQUIRED? | Yes | No |

FIG. 10 (b)

| CONFORMATION OF APPLICATION SOFTWARE | BACKWARD | OK |
|---|---|---|
| SCAN DATA WILL BE FETCHED BY THE FOLLOWING APPLICATION SOFTWARE. BUSINESS CARD FILING △△△ | | |

FIG. 10 (c)

| SELECT CLIENT PC | CANCEL | OK |
|---|---|---|
| PLEASE SELECT CLIENT PC BY WHICH DATA IS FETCHED. HANAKO YAMADA   ICHIRO TANAKA | | |

FIG. 10 (d)

| SETTING OF SCAN CONDITIONS | BACKWARD | OK |
|---|---|---|
| COLOR MODE  BLACK AND WHITE   GRAYSCALE   FULL COLOR  RESOLUTION  400X400dpi   600X600dpi | | |

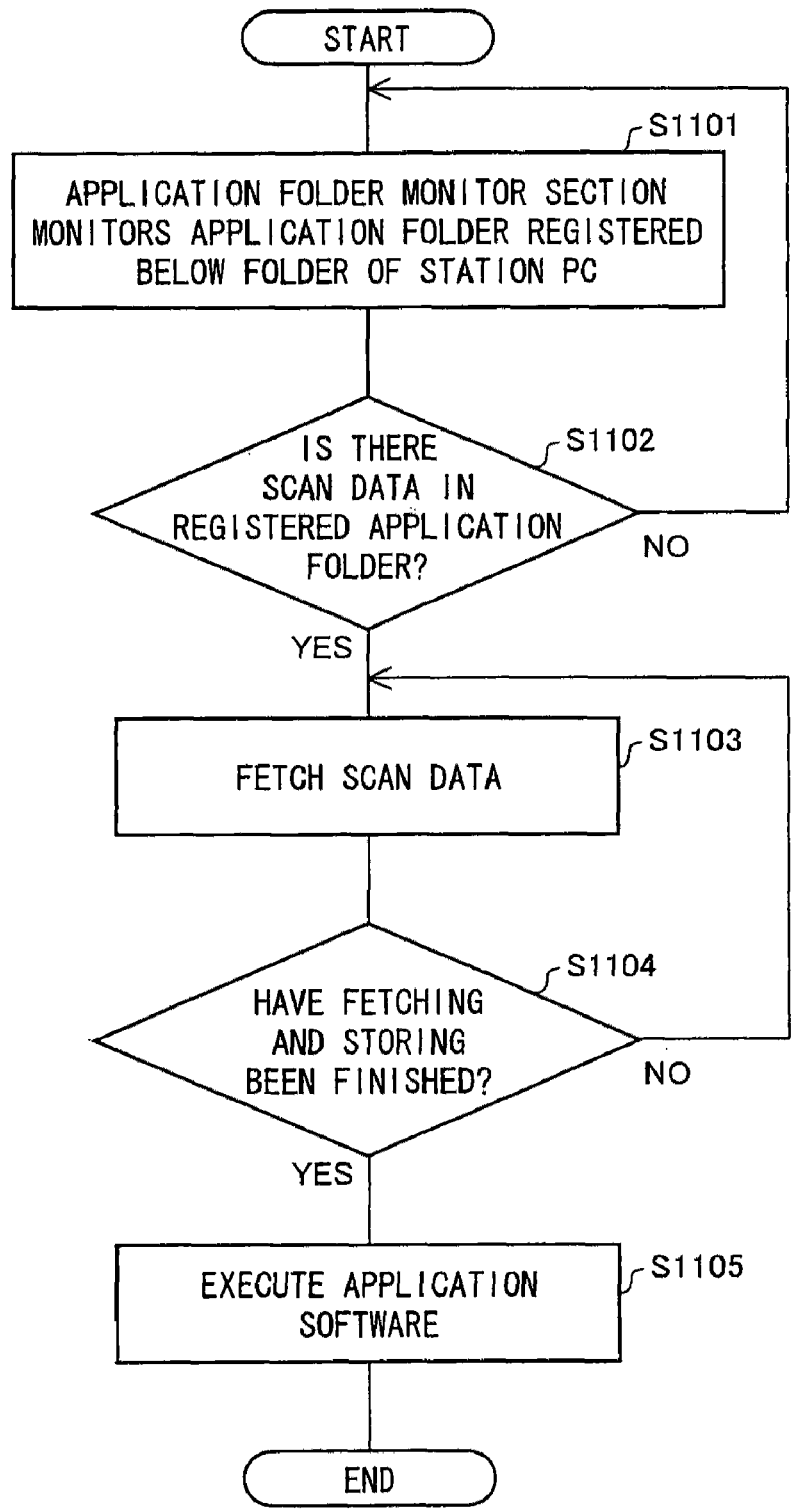

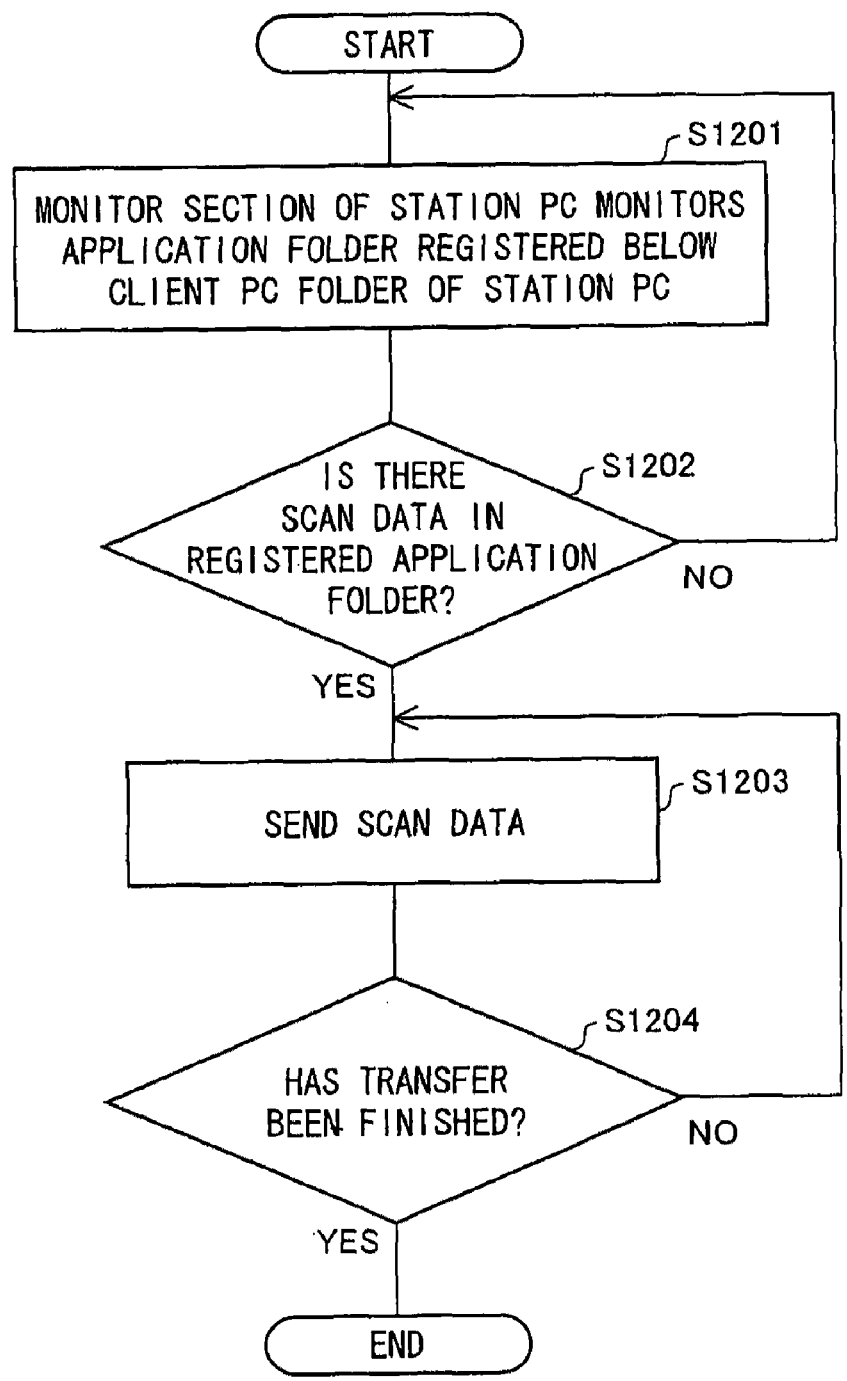

FIG. 13

| Last Name | YAMADA | First Name | HANAKO |
|---|---|---|---|
| Company | ○○○○ ltd. | | |
| Post | CEO | | |
| E-mail | hanako.takahashi@---.co.jp | | |
| Office Address | 000-0000 Nara city... | | |
| FAX | 000-000-0000 | TEL | 000-000-0000 |
| Mobile Phone Number | 090-000-0000 | URL | http:// |

7320 50th St. N.w.Seattle, WA 123-456-789 hanako.yamada@abc.ne.jp

| 目的 | 語学、コンピュータースキル、外国人旅行客を対象とした旅行業界での職務経験を活用するため | | |
|---|---|---|---|
| スキル | ■ 日本語のネイティブスピーカー<br><br>■ スペイン語と英語における高度な堪能<br><br>■ ..................................<br>■ ..................................<br>..................................<br>..................................<br>■ ..................................<br><br>■ ..................................<br>■ .................................. | | |
| 職歴 | オフィス<br>アシスタント | AAA 株式会社<br>ワシントン州シアトル | 2000-2002 |
| | ... | ... | ... |
| | ... | ... | ... |
| | ... | ... | ... |
| 学歴 | 学士 | ワシントン大学<br>ワシントン州シアトル | 2000 |

IMAGE READOUT SYSTEM, SERVER APPARATUS, IMAGE READOUT APPARATUS, AND TERMINAL APPARATUS

This Nonprovisional application claims priority under 35 U.S.C. §119(a) on Patent Application No. 249982/2006 filed in Japan on Sep. 14, 2006, the entire contents of which are hereby incorporated by reference.

FIELD OF THE INVENTION

The present invention relates to a network scanner system (image read out system) in which a scanner apparatus (image readout apparatus) is connected to a client apparatus (terminal apparatus) over a network. More specifically, the present invention relates to a network scanner system in which scan data read out by a scanner apparatus is stored in a specific application data folder of a client apparatus and automatic analysis (data processing) of the scan data is executed by an application software.

BACKGROUND OF THE INVENTION

In today's IT-driven office environment, an important factor in improvement of efficiency is in that an image of a paper document or the like is read out by a scanner apparatus and the image is stored and managed in the form of electronic scan data.

New scanner apparatuses having an additional function have recently been developed. Such a scanner apparatus not only reads out data but also is capable of sending the data thus read out to a shared folder of a client apparatus (e.g. personal computer) which has been registered in advance.

Applications software for storing, managing, and processing images read out by a scanner apparatus have been diffused. Some types of such applications software automatically perform data processing (analysis) such as tilt correction and OCR process with respect to data stored in a specific folder (application data folder) of a client apparatus.

At the current technological level, to automatically perform data processing by applications software, data to be processed must be stored in a particular folder specified by each type of applications software.

In such an environment where a scanner apparatus and an application software are used, for example, there have been following three ways to store data in the specific folder and perform data processing with respect to the stored data.

In the first way, either after scan data is supplied in the form of an attachment to e-mail from the scanner apparatus to the client apparatus or after scan data is sent to a specific folder of the client apparatus, the user operates the client apparatus so as to store the data in an application data folder.

In the second way, as recited in the below-mentioned patent document 1, the scanner apparatus searches (browses in) a network so as to acquire the directory structure of the client apparatus which is the destination of data, and the user selects a desired destination of data by means of the display screen of the scanner apparatus.

In the third way, as recited in the below-mentioned patent document 2, the paths of respective shared folders of client apparatuses are registered in advance in the scanner apparatus, and a shared folder among the registered shared folders is selected as the destination of storing, by means of the operation panel or the like of the scanner apparatus, so that scan data is stored in the selected client apparatus.

However, to store scan data in the specific application data folder, all of these ways involve troublesome procedures such that scan data must be manually moved, the directory structure of the target client apparatus must be searched for, and the user is required to specify the destination among all registered apparatuses.

For example, in the first way, the user is required to manually re-store, in an application data folder of a client apparatus, the data received by the client apparatus.

In the second way, the user is required to select a desired client apparatus among many client apparatuses on the network, and also required to repeat inputs until a desired storage location is found in the multilayered directory of the selected client apparatus.

In the third way, the shared folders of all client apparatuses are registered in the scanner apparatus. The user is therefore required to find and select a desired shared folder among numerous registered shared folders. Since it takes a long time to complete the selection, the efficiency may be deteriorated rather than improved. For example, many users share a scanner apparatus and each client apparatus has many shared folders, in a typical office environment. Therefore, according to the third way, it is necessary to store sets of destination information corresponding to the number of client apparatuses connected to the scanner apparatus and corresponding to the number of shared folders of the client apparatuses. The user is therefore required to find and select a desired set of destination information from many sets of destination information. Such operations are troublesome and time-consuming.

Furthermore, in the third way, in case where an application data folder is not a shared folder, it is not possible to directly store scan data in the application data folder from the scanner apparatus. The user is therefore required to manually move, to the application data folder, scan data stored in a shared folder. Alternatively, the user is required to set the application data folder as a shared folder in advance.

The following patent documents 3-9 teach technologies in regard to automatic identification of document formats.

Patent Document 1

Japanese Laid-Open Patent Application No. 2003-274102 (published on Sep. 26, 2003)

Patent Document 2

Japanese Laid-Open Patent Application No. 2005-094444 (published on Apr. 7, 2005)

Patent Document 3

Japanese Laid-Open Patent Application No. 2002-150218 (published on May 24, 2002)

Patent Document 4

Japanese Laid-Open Patent Application No. 5-81464 (published on Apr. 2, 1993)

Patent Document 5

Japanese Laid-Open Patent Application No. 11-110479 (published on Apr. 23, 1999)

Patent Document 6

Japanese Laid-Open Patent Application No. 9-305075 (published on Nov. 28, 1997)

Patent Document 7

Japanese Laid-Open Patent Application No. 10-21382 (published on Jan. 23, 1998)

Patent Document 8

Japanese Laid-Open Patent Application No. 10-171920 (published on Jun. 26, 1998)

Patent Document 9

Japanese Laid-Open Patent Application No. 8-315069 (published on Nov. 29, 1996)

SUMMARY OF THE INVENTION

The present invention was done to solve the problem above, and the objective of the present invention is to achieve the following advantages: in an image readout system in which an image readout apparatus is connected with a terminal apparatus over a network, scan data read out by the image readout apparatus is efficiently stored and data processing to the scan data by an application software is efficiently performed, and hence the level of convenience is increased for the user.

To achieve the objective above, an image readout system of the present invention includes: an image readout apparatus reading out an image from a document so as to generate scan data; a server apparatus storing the scan data; and at least one terminal apparatus acquiring the scan data from the server apparatus, said at least one terminal apparatus having at least one application software by which data processing is performed with respect to data stored in a particular folder of a storage section of said at least one terminal apparatus, the server apparatus including server control means for generating, in a server storage section of the server apparatus, at least one application folder which is associated with said at least one terminal apparatus and said at least one application software of said at least one terminal apparatus.

According to the arrangement above, there is server control means which generates, in the server storage section, an application folder associated with a terminal apparatus and an application software of the terminal apparatus. This makes it possible to specify which terminal apparatus and application software should perform data processing to the scan data, only by selecting the destination for storing the scan data from the application folders in the server storage section. As a result, the user can find the destination for storing the scan data with a simpler procedure, and hence the level of convenience is increased for the user.

A server apparatus of the present invention, in an image readout system including: an image readout apparatus reading out an image from a document so as to generate scan data; the server apparatus storing the scan data; and at least one terminal apparatus acquiring the scan data from the server apparatus, said at least one terminal apparatus having at least one application software by which data processing is performed with respect to data stored in a particular folder, includes server control means for generating, in a server storage section of the server apparatus, at least one application folder which is associated with said at least one terminal apparatus and said at least one application software of said at least one terminal apparatus.

According to this arrangement, there is server control means which generates, in the server storage section, an application folder associated with a terminal apparatus and an application software of the terminal apparatus. This makes it possible to specify which terminal apparatus and application software should perform data processing to the scan data, only by selecting the destination for storing the scan data from the application folders in the server storage section. As a result, the user can find the destination for storing the scan data with a simpler procedure, and hence the level of convenience is increased for the user.

An image readout apparatus of the present invention, in an image readout system including: the image readout apparatus reading out an image from a document so as to generate scan data; a server apparatus storing the scan data; and at least one terminal apparatus acquiring the scan data from the server apparatus, said at least one terminal apparatus having at least one application software by which data processing is performed with respect to data stored in a particular folder, includes: display means for displaying an image for specifying a terminal apparatus and an application software associated with at least one application folder in the server apparatus, with reference to identification information of said at least one terminal apparatus and identification information of said at least one application software, the sets of identification information being acquired from the server apparatus; and instruction input means for receiving an instruction for selecting one of said at least one application folder, to which the scan data is to be stored.

According to this arrangement, the display means displays an image for specifying a terminal apparatus and an application software associated with the application folder, with reference to the identification information of the terminal apparatus and the identification information of the application software, the terminal apparatus and the application software being associated with the application folder. The instruction input means then receives an instruction of the user for selecting which application folder the scan data is stored. This allows the user to grasp the application folders in the server apparatus, i.e. the terminal apparatuses and applications software registered in the server apparatus, and to easily select a desirable terminal apparatus and application software, from the registered terminal apparatuses and applications software.

At least one terminal apparatus of the present invention, in an image readout system including: an image readout apparatus reading out an image from a document so as to generate scan data; a server apparatus storing the scan data; and said at least one terminal apparatus acquiring the scan data from the server apparatus, said at least one terminal apparatus having at least one application software by which data processing is performed with respect to data stored in a particular folder, includes registration information notifying means for sending, to the server apparatus, registration information including identification information of said at least one terminal apparatus and identification information of said at least one application software of said at least one terminal apparatus.

According to the arrangement above, registration information including identification information of a terminal apparatus and identification information of an application software desired to be registered in the server apparatus is sent from the terminal apparatus to the server apparatus, so that the server apparatus can generate, in the server storage section of the server apparatus, an application folder associated with the terminal apparatus and the application software. In other words, it is possible to register, in the server apparatus, a terminal apparatus and an application software of the terminal apparatus, by sending registration information including the sets of identification information from the terminal apparatus to the server apparatus.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 5 illustrates an example of a business card format.

FIG. 6 illustrates an example of an English resume.

FIGS. 7(a)-7(d) show examples of display screens displayed on a scanner apparatus of the network scanner system shown in FIG. 1.

FIGS. 10(a)-10(d) show examples of display screens displayed on a scanner apparatus in the network scanner system shown in FIG. 1.

FIG. 11 is a flowchart of an example of a fetching step in the network scanner system shown in FIG. 1.

FIG. 12 is a flowchart of another example of the fetching step in the network scanner system shown in FIG. 1.

FIG. 13 illustrates an example of a database of business card information generated by an application software in the network scanner system shown in FIG. 1.

FIG. 14 illustrates an example of a Japanese resume generated by an application software in the network scanner system shown in FIG. 1.

DESCRIPTION OF THE EMBODIMENTS

The following will discuss an embodiment of the present invention.

(1) Network Scanner System 1

Figure 1:
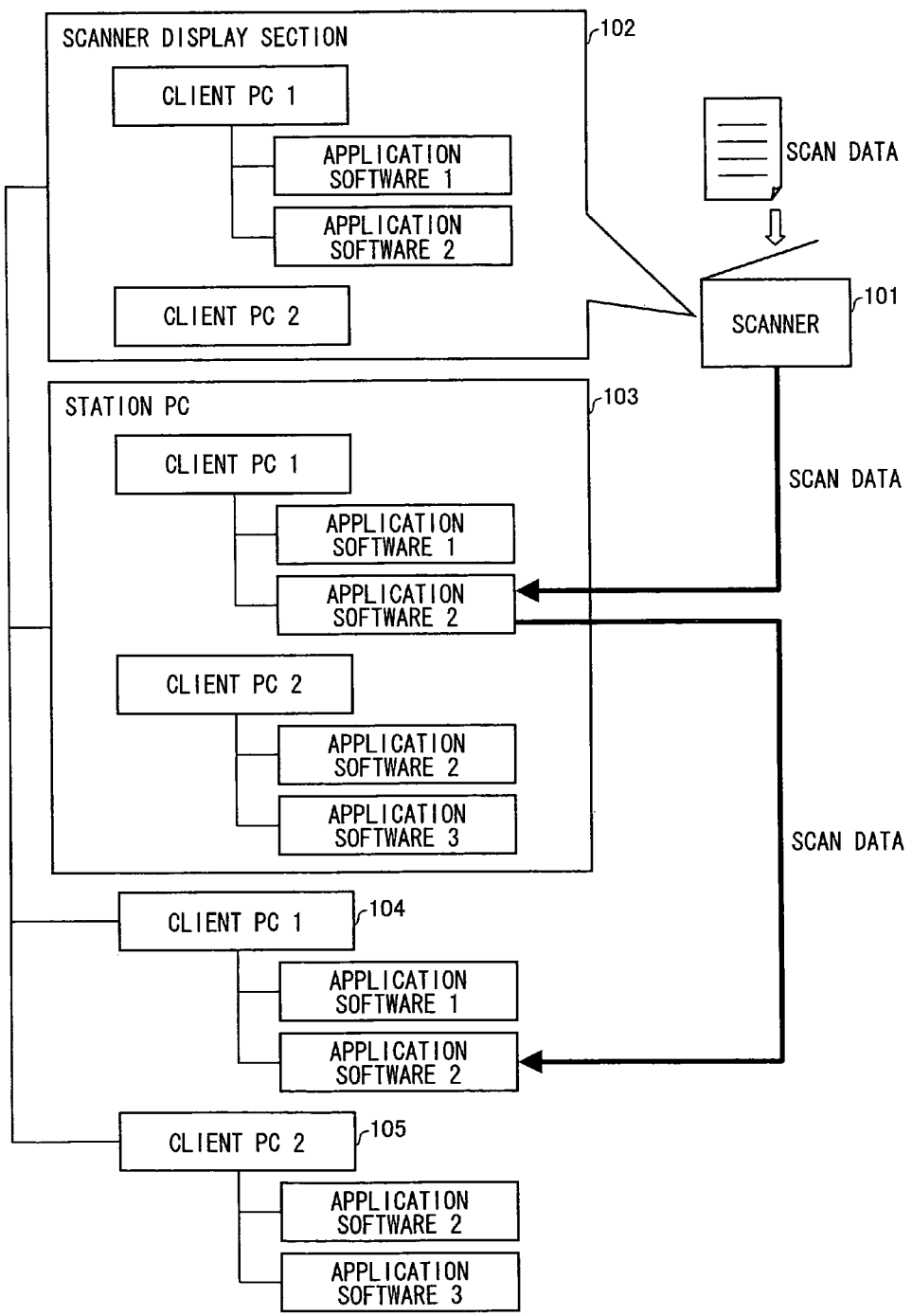
FIG. 1 outlines a network scanner system of an embodiment.

FIG. 1 is a conceptual diagram outlining a network scanner system (image readout system) 1 of an embodiment. As shown in the figure, the network scanner system 1 includes a scanner apparatus (image readout apparatus) 101, a station PC (server apparatus) 103, and client PCs (client apparatus, terminal apparatus) 104 and 105. These apparatus are capable of communicating with one another over a network. The figure shows an example of an operation screen displayed on a scanner display section of the scanner apparatus 101. The figure also shows an example of folder structures in the station PC 103 and the client PCs 104 and 105, respectively.

The scanner apparatus (image readout apparatus) 101 reads out a document image so as to acquire scan data, and sends the acquired scan data to the station PC 103 over the network.

The station PC 103 has a function to store, for example, information of various applications software installed in the client PCs, and to send the information to the scanner apparatus 101. Also, the station PC 103 has a function to temporarily store scan data supplied from the scanner apparatus 101. In the present embodiment, the station PC 103 is basically provided outside the scanner apparatus 101. Alternatively, the functions of the station PC 103 may be performed by either the scanner apparatus 101 or an apparatus provided in the scanner apparatus 101.

Each of the client PCs 104 and 105 acquires the scan data temporarily stored in the station PC 103 and performs a predetermined process to the scan data by means of an application software. The client PC 104 is installed with applications software 1 and 2 whereas the client PC 105 is installed with applications software 2 and 3. In the present embodiment, there are basically two client PCs. Alternatively, the number of client PC may be either one or more than two.

Figure 2:
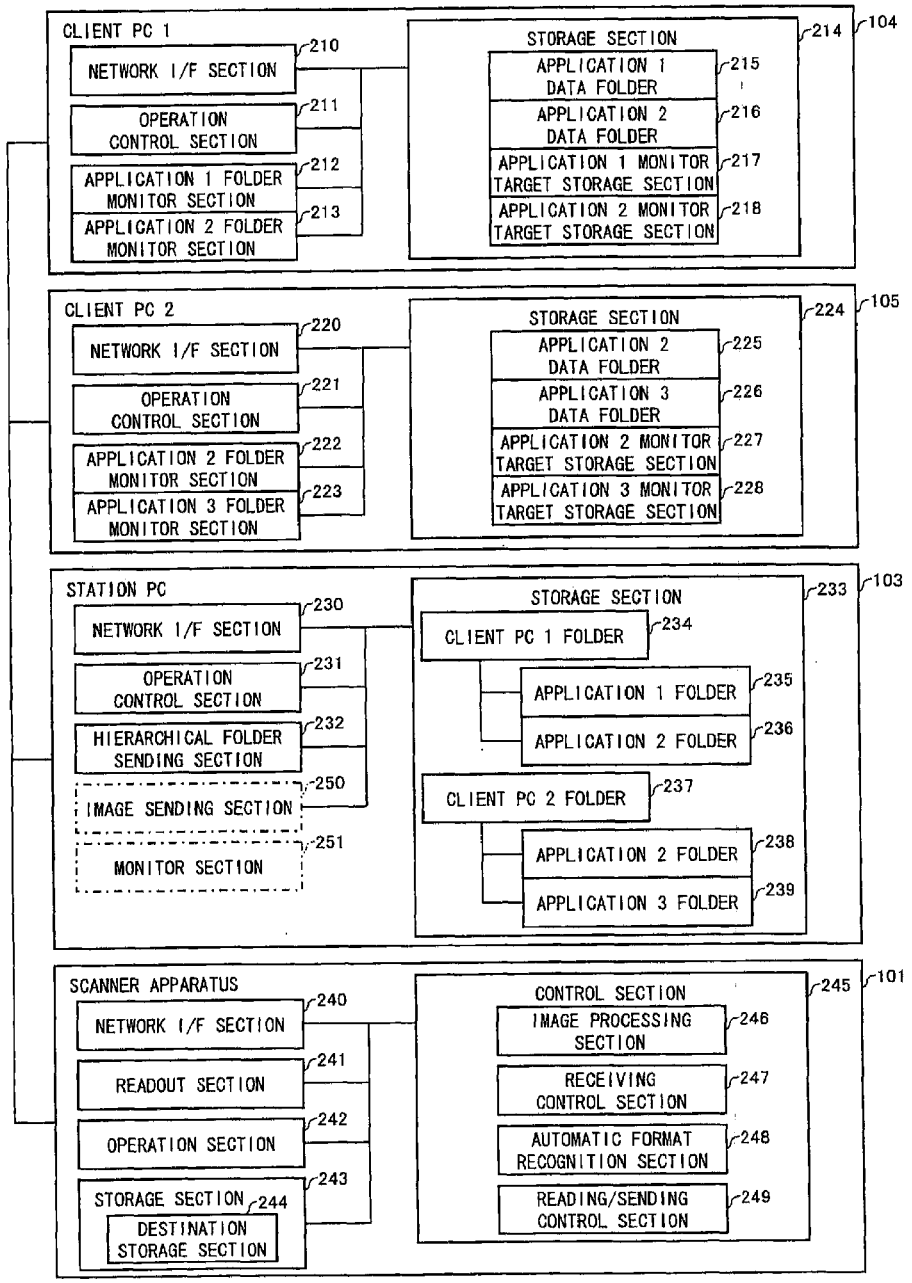
FIG. 2 is a block diagram showing apparatuses constituting the network scanner system shown in FIG. 1.

FIG. 2 is a block diagram showing the apparatuses constituting the network scanner system 1. As shown in the figure, the client PCs 104 and 105, the station PC 103, and the scanner apparatus 101 are connected over a network 201 such as LAN, for example.

The client PC 104 is provided with a network I/F (interface) section 210, an operation control section 211, an application 1 folder monitor section 212, an application 2 folder monitor section 213, and a storage section 214.

The network I/F section 210 is an interface for communications with an another apparatus over the network 201.

The operation control section 211 controls the operations of the sections of the client PC 104.

The application 1 folder monitor section 212 monitors an application 1 folder 235 in the storage section 233 of the station PC 103. The application 2 folder monitor section 213 monitors an application 2 folder 236 in the storage section 233 of the station PC 103.

The storage section 214 is provided with an application 1 data folder 215, an application 2 data folder 216, an application 1 monitor target storage section 217, and an application 2 monitor target storage section 218.

The application 1 data folder 215 and the application 2 data folder 216 are locations where scan data which are targets of automatic processes (automatic analysis processes) performed by the respective applications software are stored. These application data folders may or may not be shared folders (which can be browsed and edited by apparatuses connected to the network).

The application 1 monitor target storage section 217 stores a path (address) of the application 1 folder 235 of the station PC 103, whereas the application 2 monitor target storage section 218 stores a path of the application 2 folder 236 of the station PC 103. However, in case where the station PC 103 automatically transfers data to the client PCs 104 and 105 as below, the application 1 folder monitor section 212, the application 2 folder monitor section 213, the application 1 monitor target storage section 217, and the application 2 monitor target storage section 218 may not be necessary.

The client PC 105 is provided with a network I/F (interface) section 220, an operation control section 221, an application 2 folder monitor section 222, an application 3 folder monitor section 223, and a storage section 224.

The network I/F section 220 is an interface for communications with other apparatuses over the network 201.

The operation control section 221 controls the operations of the sections of the client PC 105.

The application 2 folder monitor section 222 monitors an application 2 folder 238 in the storage section 233 of the station PC 103. The application 3 folder monitor section 233 monitors an application 3 folder 239 in the storage section 233 of the station PC 103.

The storage section 224 is provided with an application 2 data folder 225, an application 3 data folder 226, an application 2 monitor target storage section 227, and an application 3 monitor target storage section 228.

The application 2 data folder 225 and the application 3 data folder 226 are locations where scan data which are targets of automatic processes (automatic analysis processes) performed by the respective applications software are stored. These application data folders may or may not be shared folders (which can be browsed and edited by apparatuses connected to the network).

The application 2 monitor target storage section 227 stores a path (address) of the application 2 folder 238 in the station PC 103, whereas the application 3 monitor target storage section 228 stores a path of the application 3 folder 239 in the station PC 103. However, being similar to the client PC 104, if the automatic transfer is performed, the application 1 folder monitor section 212, the application 2 folder monitor section 213, the application 1 monitor target storage section 217, and the application 2 monitor target storage section 218 may not be necessary.

The station PC 103 is provided with a network IF section 230, an operation control section 231, a hierarchical folder sending section 232, and a storage section 233.

The network IF section 230 is an interface for communications with other apparatuses over the network 201.

The operation control section 231 controls the operations of the sections of the station PC 103.

The hierarchical folder sending section 232 sends, to the scanner apparatus 101, information of applications software of each client PC, stored in the storage section 233 (examples of the information include hierarchical folder data indicating a hierarchical structure of client PC folders or application folders, and a path of each application folder).

The storage section 233 includes: a client PC 1 folder 234; an application 1 folder 235 and an application 2 folder 236 which are provided in the layer below the client PC 1 folder 234; a client PC 2 folder 237; and an application 2 folder 238 and an application 3 folder 239 which are provided in the layer below the client PC 2 folder 237. In the present embodiment, application folders are provided in the layer below a client PC folder. Alternatively, a client PC folder may be provided in the layer below a client PC folder. How these hierarchical folders are registered and generated, and how data are stored in such folders will be discussed below.

Thanks to these hierarchical folders, even if each client is installed with plural applications software, scan data read out by the scanner apparatus 101 can be temporarily stored in the folder for the associated client PC and application software by which a process to the scan data is carried out. In the present embodiment, both the client PCs 104 and 105 are installed with the same application 2. However, the client PC 104 is distinguished from the client PC 105 so that the scanner apparatus 101 can distinctively deal with applications software of the client PC to which the scan data is transferred.

In case where the station PC 103 automatically sends data to the client PCs 104 and 105, an image sending section 250 and a monitor section 251 are additionally provided as indicated by dashed lines in FIG. 2.

The monitor section 251 monitors application folders where scan data is temporarily stored.

When the monitor section 251 detects that scan data is stored in any one of the application folders, the image sending section 250 automatically sends the scan data to an application data folder of the client PC associated with the application folder where the scan data is stored. For example, in case where the application data folder is a shared folder, the operation control section 231 of the station PC 103 stores the scan data in that folder. On the other hand, in case where the application data folder is not a shared folder, the operation control section 231 specifies the path of the folder and sends the scan data to the client PC, and the operation control section of the recipient client PC stores the supplied scan data in the specified folder.

The scanner apparatus 101 includes a network IF section 240, a readout section 241, an operation section 242, a storage section 243, and a control section 245.

The network IF section 240 is an interface for communications with other apparatuses over the network 201.

The readout section 241 reads out characters, symbols, and images from a document such as a paper document and generates scan data therefrom.

The operation section 242 receives user inputs for, for example, setting the destination of scan data. The operation section 242 includes a scanner display section 102 which displays, for example, information for assisting the user to input instructions.

The storage section 243 includes a destination storage section 244 where at least a destination of scan data is registered.

The control section 245 controls the operation of the sections of the scanner apparatus 101, and includes an image processing section 246, a receiving control section 247, an automatic format recognition section 248, and a reading/sending control section 249.

The image processing section 246 receives scan data read out by the readout section 241 and performs predetermined image processing with respect to the scan data.

The receiving control section 247 controls a process to receive information (e.g. hierarchical folder data, path of each application folder) of an application software of each client PC, which information is supplied from the station PC 103.

The automatic format recognition section 248 automatically judges the format of a document. If the format is not automatically judged, the automatic format recognition section 248 may be unnecessary.

A method of automatic judgment of the format is not particularly limited. Conventional methods may be used to perform the judgment. For example, the format of a document may be judged with reference to characteristics of each pixel, of a block constituted by plural pixels, or of the entire document, extracted from scan data. In the present embodiment, format information (characteristics or the like for specifying the format) associated with an application software is registered (stored) in the storage section 233, and the automatic judgment of the format is performed by comparing the characteristics of the scan data with the characteristics of the registered format information.

Examples of the aforesaid characteristics are one of or a combination of the following items: size, shape, and aspect ratio of a document represented by scan data; average density and density distribution of scan data; color components and color distribution of scan data; frequency components of a document represented by scan data; optical reflectance of scan data; formats, fonts, and number of digits of characters, numbers, symbols or the like used in a document, acquired by performing OCR with respect to scan data; the number of characters in at least a part of a document represented by scan data; existence of the type of language, particular characters, numbers, and symbols, or a code which is a combination thereof, in scan data; the size, construction, and disposition of a block which is a character part in at least a part of a document in scan data; the disposition, thickness, and type of a line, ruling or the like in at least a part of a document represented by scan data (see patent documents 3-9). The automatic judgment may be performed by, for example, classifying documents with particular formats, by analyzing indices of documents and layouts including barcodes or the like at particular positions.

For example, in the present embodiment, in case where a business card shown in FIG. 5 is read out, the automatic format recognition section 248 automatically judges that the image thus read out has a business card format, and an application software associated with the business card format performs a predetermined process. On the other hand, in case where an English resume is read out, the automatic format recognition section 248 automatically judges that the image thus read out has an English resume format, and an application software associated with the English resume format performs a predetermined process.

The types and number of formats to be automatically judged are not particularly limited, and are optionally determined in accordance with, for example, the number of registered applications software and the number of formats associated with the applications software.

The reading/sending control section 249 controls reading (acquisition of scan data) by the readout section 241 and sending of scan data to the station PC 103. Among application folders of the station PC 103, which are registered in the destination storage section 244, the reading/sending control section 249 selects a folder to which scan data is to be supplied, and sends the scan data to the selected folder. For example, in case where the application folder is a shared folder, the reading/sending control section 249 stores the scan data in this folder. In case where the application folder is not a shared folder, the reading/sending control section 249 specifies a path of the folder and sends the path and the scan data to the station PC 103, and the operation control section 231 of the station PC 103 stores the supplied scan data in the folder corresponding to the path.

The registration control section 260 controls a process to register an application software. Details of the process will be given later.

(2) Operation of Network Scanner System 1

Processes performed in the network scanner system 1 are divided into the following three steps (a)-(c).

(a) Registration step to register an application software on a client PC to the station PC 103

(b) Reading/sending step to read out scan data by the scanner apparatus 101 and sending the data to the station PC 103.

(c) Fetching step in which the client PC fetches scan data from the station PC 103.

(2-1) Registration Step

Figure 3:
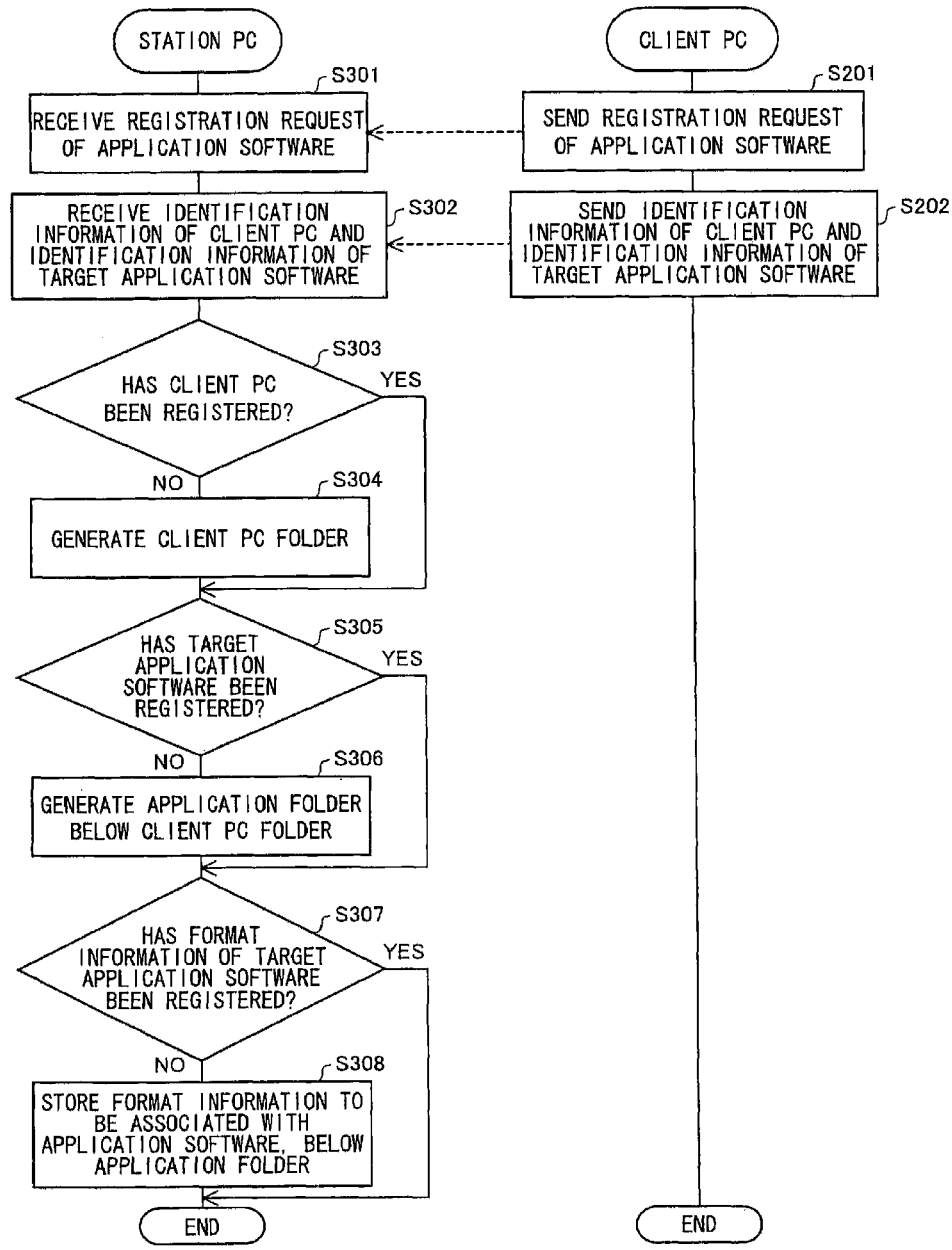
FIG. 3 is a flowchart showing the flow of a registration step of an application software in the network scanner system shown in FIG. 1.

The following will discuss the registration step which is the first step. FIG. 3 is a flowchart showing the flow of processes in the station PC 103 and the client PC 104, in the registration step. It is noted that, although the following deals with a case where an application software of the client PC 104 is registered, similar processes are performed to register an application software of the client PC 105.

As shown in the figure, the operation control section 211 of the client PC 104 sends a registration request of an application software to the station PC 103 (S201). This process may be, for example, performed by the operation control section 211 in response to an instruction from the user, or may be automatically performed by the operation control section 211 when a new application software is installed in the client PC 104.

The operation control section 211 of the client PC 104 also sends, to the station PC 103, identification information of the client PC 104, identification information of the application software to be registered, and format information to be associated with the application software (i.e. format information used for automatic judgment, such as image data and characteristics of an image for specifying the format) (S202). Examples of the identification information of the client PC 104 include an IP address of the client PC 104 and a MAC address of the client PC 104. Examples of the identification information of the application software include the name and identifier of the application software. The format information to be associated with the application software may not be sent if automatic judgment of the format is not carried out.

The receiving control section 247 of the station PC 103 receives the registration request of the application software from the client PC 104 (S301), and also receives, from the client PC 104, the identification information of the client PC 104, the identification information of the application software to be registered, and the format information to be associated with the application software (S302). After receiving the registration request in S301, the registration control section 260 may return registration allowance information to the client PC 104 via the reading/sending control section 249 and the client PC 104 may perform the process in S302 in response to the registration allowance information.

Subsequently, the registration control section 260 judges whether the client PC has already been registered, with reference to the identification information received in S302 (S303). For example, the storage section 233 may store a list of sets of registered identification information and the judgment may be made with reference to the list. Alternatively, the judgment may be made by checking whether a client PC 1 folder has been made in the storage section 233.

If the client PC 104 has not been registered, a client PC 1 folder is made in the storage section 233 (S304). In addition, information required for identifying the client PC 104 is stored in the storage section 233, if necessary.

In case where the client PC 104 has already been registered in S303 or after the client PC 1 folder is generated in S304, the registration control section 260 judges whether the application software has been registered, with reference to the identification information of the application software supplied in S302 (S305). For example, the judgment may be made by checking whether the application folder for the application has been made in the storage section 233. Alternatively, a list of registered applications software may be generated for each client PC and stored in the storage section 233, and the judgment may be made with reference to the list.

If the application software has not been registered, an application folder for that application software is made in a layer lower than the client PC 1 folder (S306). Furthermore, information required for identifying the application software is stored in the storage section 233, if necessary.

If the application folder has already been registered in S305 or after the application folder is made in S306, the registration control section 260 judges, with reference to the format information which has been supplied in S302 and is to be associated with the application software (S305), whether the format information has been registered. For example, the judgment may be made by checking whether the format information has been stored in a folder lower than the application folder. Alternatively, a list indicating whether there is format information associated with each registered application software may be generated and stored in the storage section 233, and the judgment may be made with reference to the list.

If the format information has not been registered, a folder (not illustrated) is made below the application folder to store the format information, and the format information is stored in that folder (S308). If necessary, information required for judging whether format information has been registered is additionally stored in the storage section 233.

After the process above, the registration step of registering the client PC 104 and the application software is finished. Table 1 shows examples of registration information generated by the step above.

TABLE 1

| | Values |
|---|---|
| Identification information of client PC | 111, 111, 1, 111 |
| Identification information of application software (name of application software) | Business card filing ΔΔΔ |
| Path of application data folder | .../clientpc1/meishi_data |
| Path of format information to be associated | .../clientpc1/meishi_data/Meishi_Format.tiff |

These sets of registration information are referred to in the reading/sending step and the fetching step.

Registration information is not limited to the above. For example, it is possible to additionally provide an item where whether password authentication is required for client PCs and application folders is defined and passwords are registered. The number of sets of format information associated with an application software may be optionally determined. Alternatively, an automatic format judgment function of a scanner apparatus may be called and only characteristics of an image (e.g. types and dispositions of character strings, lines, and symbols) may be registered as format information.

In the present embodiment, an application folder is made below a client PC folder. An application folder, however, may be made differently. For example, an application folder may be provided for each application software and a folder of the client PC where the application software is registered may be made below said each application folder.

(2-2) Reading/Sending Step

Figure 4:
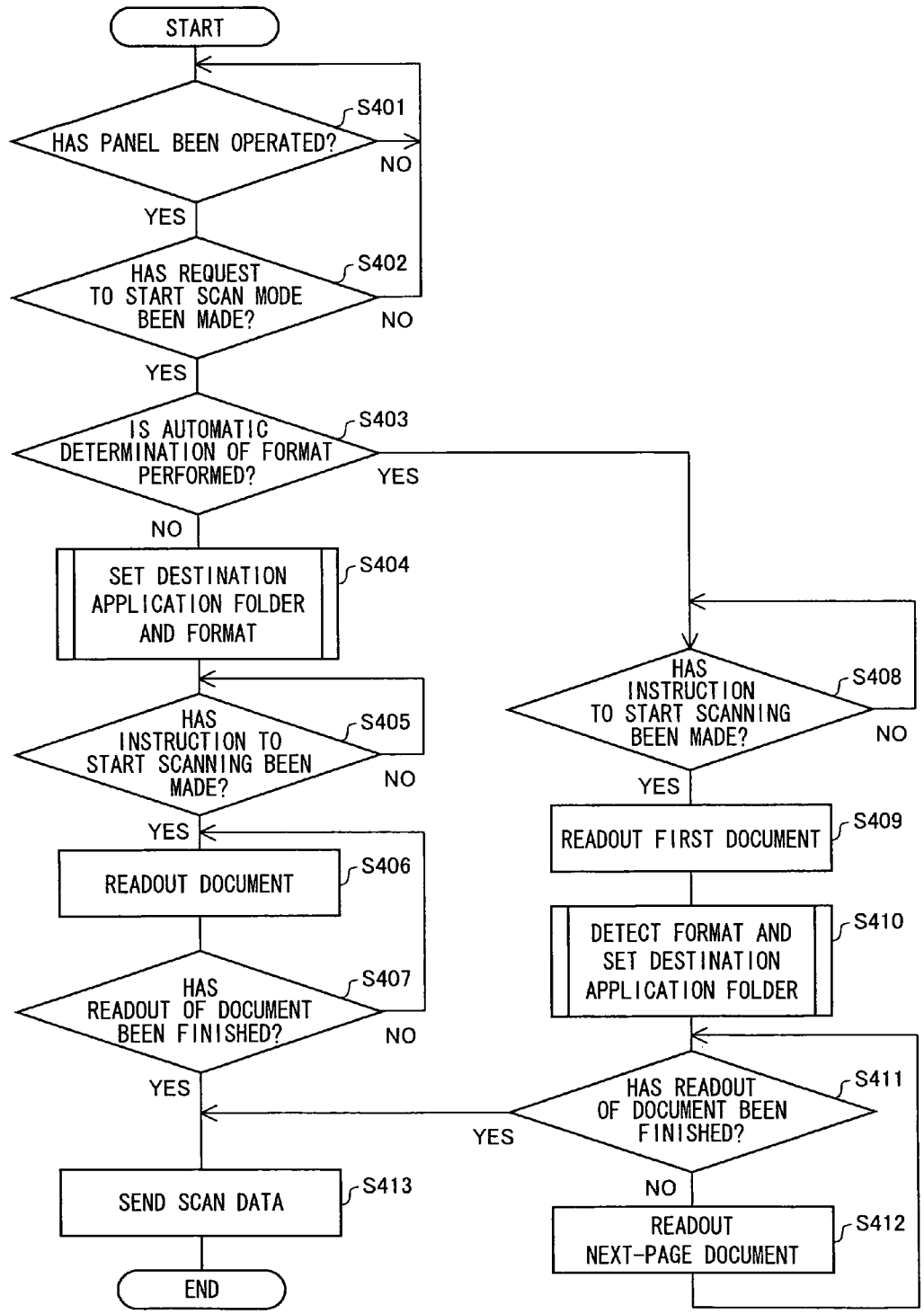
FIG. 4 is a flowchart showing the flow of a reading and sending step in the network scanner system shown in FIG. 1.

The following will discuss the reading/sending step which is the second step. FIG. 4 is a flowchart illustrating the flow of processes in the client PC 104, in the reading/sending step. It is noted that, although processes in the reading/sending step in the client PC 104 will be discussed below, processes in the client PC 105 are similar to them.

The reading/sending control section 249 monitors if an operation panel (not illustrated) has been operated by the user (S401). If the panel has been operated, the reading/sending control section 249 judges whether the panel operation is a request to start a scan mode (image readout mode) (S402). If the operation is not a request to start the scan mode, a predetermined process corresponding to the panel operation is performed and the process returns to S401 to monitor the next panel operation.

On the other hand, if it is judged in S402 that the operation is a request to start the scan mode, the reading/sending control section 249 judges whether automatic judgment of the format is to be performed (S403). For example, the reading/sending control section 249 causes the scanner display section 102 to display a display screen shown in FIG. 7(*a*), and judges if automatic judgment is to be performed with reference to an instruction from the user.

If it is judged in S403 that automatic judgment of the format is not to be performed, the reading/sending control section 249 sets the destination application folder and the format (S404).

Figure 8:
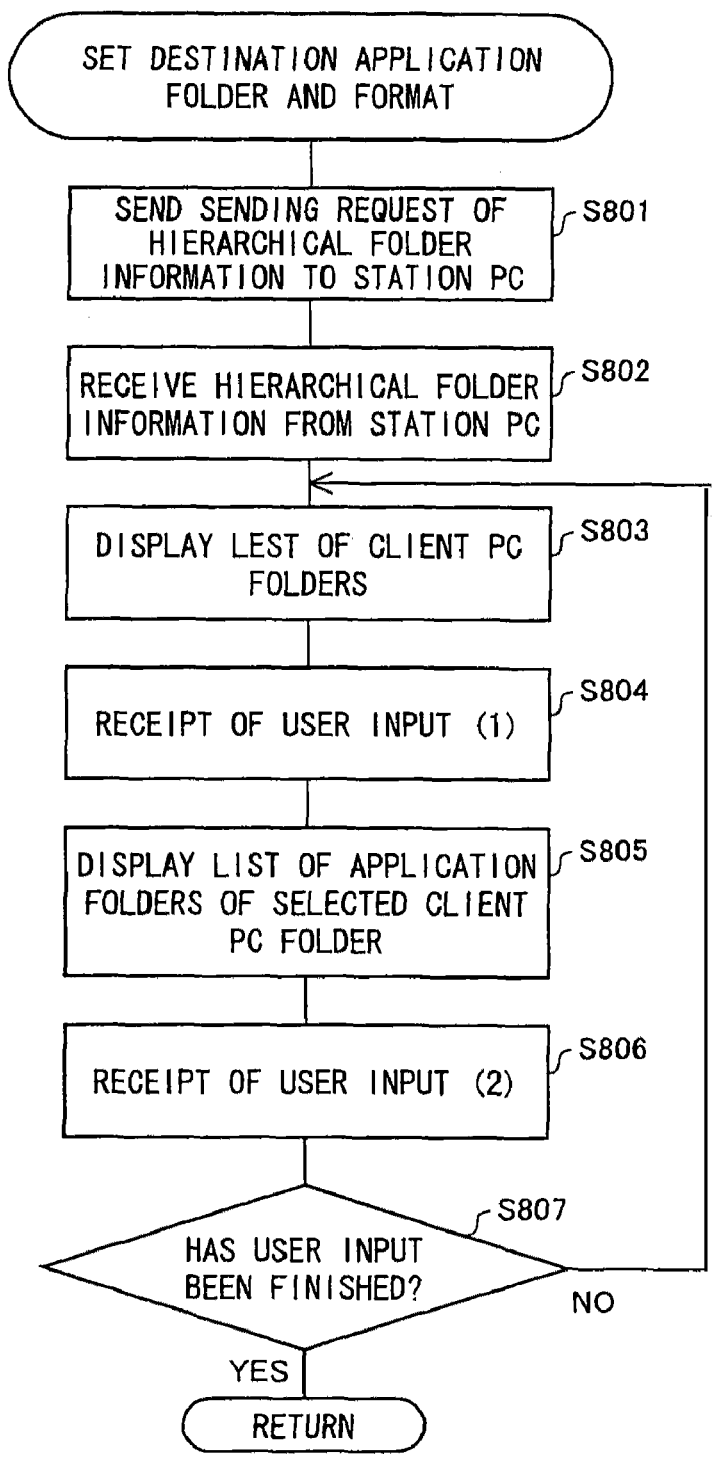
FIG. 8 is a flowchart showing the flow of setting process to set a destination application folder and a format, in the reading and sending step in the network scanner system shown in FIG. 1.

FIG. 8 is a flowchart showing details of the process in S404. As shown in the figure, the reading/sending control section 249 sends, to the station PC 103, a request to send hierarchical folder information (S801), and receives the hierarchical folder information from the station PC 103 (S802).

Subsequently, the reading/sending control section 249 causes the scanner display section 102 to display a list of client PCs included in the hierarchical folder information, so as to prompt the user to select which client PC fetches (stores) scan data (S803). FIG. 7(*b*) shows an example of the display screen in S803.

The reading/sending control section 249 then receives the selection of the client PC made by the user (receipt of user input (1)), and causes the storage section 243 to register the selected client PC (S804).

Subsequently, the reading/sending control section 249 refers to the hierarchical folder information and causes the scanner display section 102 to display a list of applications software associated with application folders below the client PC folder associated with the client PC selected in S804, and the reading/sending control section 249 prompts the user to select which application software is used to fetch the scan data (S805). FIG. 7(*c*) shows an example of the display screen in S805.

Subsequently, the reading/sending control section 249 receives the selection of the application software made by the user (receipt of user input (2)), and causes the destination storage section 244 to store the path of the application folder of the station PC 103, which folder is associated with the selected client PC and application software (destination application software) (S806). If necessary, a screen for setting scan conditions (e.g. formats for reading scan data, such as color mode and resolution) may be displayed to receive user input in regard to the scan conditions. FIG. 7(*d*) shows an example of the display screen in this case. User input in regard to user authentication information, such as a password, may be accepted.

Thereafter, the reading/sending control section 249 judges whether the user input has been completed (S807). If not completed, the reading/sending control section 249 repeats the processes in and after S803. If the user input has been completed, the process in S404 is finished and the entire process proceeds to the process in S405.

After the setting of the destination application folder and format in S404, the reading/sending control section 249 monitors if an instruction (scan start instruction) to start image readout has been input to the operation panel by the user (S405). When an instruction to start image readout is made, the reading/sending control section 249 reads out a document (S406). Thereafter, the reading/sending control section 249 judges whether readout of the document has fully been finished (S407). If not finished, the readout of the document is repeated from S406.

If it is judged in S407 that the readout of the document has been finished, the reading/sending control section 249 sends the scan data to the destination application folder which has been registered in S404 (S806) to the destination storage section 244 (S413), and finishes the process.

On the other hand, if it is judged in S403 that automatic judgment of the format is to be performed, the reading/sending control section 249 monitors if an instruction (scan start instruction) to perform image readout has been made by the user via the operation panel (S408). When the instruction to start image readout has been made, the reading/sending control section 249 reads out a first document (to which the automatic format judgment scheme is applied) (S409).

Subsequently, the reading/sending control section 249 causes the automatic format recognition section 248 to perform the automatic judgment of the format: of the document thus read out, and carries out setting of the destination application folder in accordance with the result of the judgment (S410).

Figure 9:
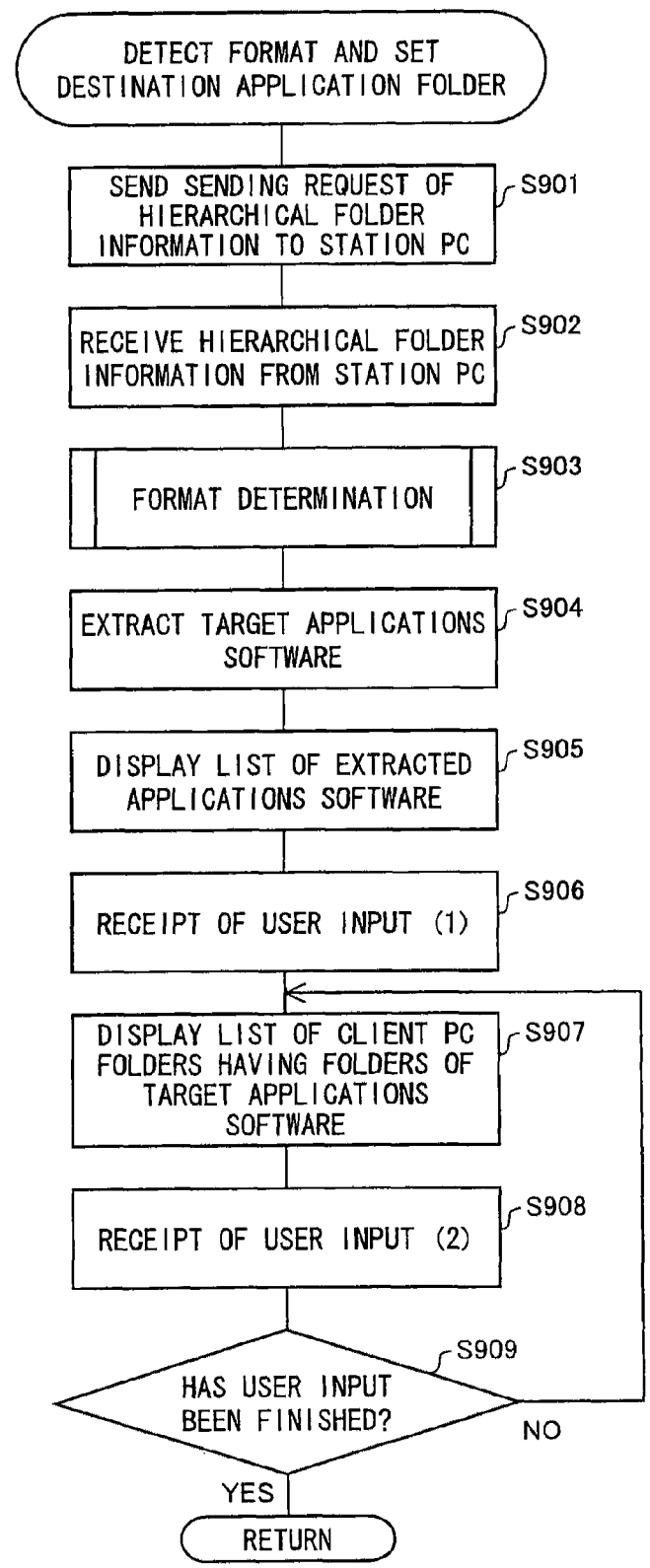
FIG. 9 is a flowchart showing automatic determination process of a format and setting process of a destination application folder, in the reading and sending step in the network scanner system shown in FIG. 1.

FIG. 9 is a flowchart showing details of the process in S410. As shown in the figure, the reading/sending control section 249 sends, to the station PC 103, a request to send hierarchical folder information (S901), and receives the hierarchical folder information from the station PC 103 (S902).

The reading/sending control section 249 then causes the automatic format recognition section 248 to perform automatic format judgment of the scan data, with reference to the image data (scan data) read out from the document and sets of format information which are stored in the station PC 103 and are associated with respective applications software (S903). After the judgment, the reading/sending control section 249 fetches, from the applications software registered in the station PC 103, an application software associated with the identified format (S904).

For example, as shown in Table 2, in the station PC 103, the business card format is associated with an application software "Business card filing ΔΔΔ" which is used for generating a database of business card information, whereas the English resume format is associated with an application software "Translation engine ooo" which is used for English-Japanese translation of English resumes. In this case, if it is judged by format judgment (layout analysis) that a document which has been read out is a business card, the application software "Business card filing ΔΔΔ" is selected as the associated application software. Similarly, if it is judged by format judgment that a document which has been read out has an English resume format, the application software "Translation engine ooo" is selected as the associated application software.

TABLE 2

| | | Applications software | |
|---|---|---|---|
| | | Business card filing ΔΔΔ | Translation engine ooo |
| Formats | Business card format | ○ | — |
| | English resume format | — | ○ |

Subsequently, the reading/sending control section 249 causes the scanner display section to display a list of associated applications software, and prompts the user to select the application software by which the scan data is to be analyzed (S905). FIG. 10(b) shows an example of the display screen in this case.

The reading/sending control section 249 then receives the selection from the user (receipt of user input (1)), and registers the selected application software to the storage section 243 (S906).

Thereafter, among the client PC folders of the station PC 103, the reading/sending control section 249 selects client PC folders having application folders corresponding to the application software selected in S906, causes the scanner display section 102 to display a list of the selected client PC folders, and prompts the user to select by which client PC the scan data is fetched (to which client PC the scan data is to be stored) (S907). FIG. 10(c) shows an example of the display screen displayed on the scanner display section 102 in S907.

The reading/sending control section 249 then receives the selection of the client PC made by the user (receipt of user input (2)), and causes the destination storage section 244 to store the path of the application folder of the station PC 103, which folder is associated with the selected client PC and application software (S908). If necessary, a screen for setting scan conditions (e.g. formats for reading scan data, such as color mode and resolution) may be displayed to receive user input in regard to the scan conditions. FIG. 10(d) shows an example of the display screen in this case.

Thereafter, the reading/sending control section 249 judges whether user input has been completed (S909), and repeats the processes in and after S905 if user input has not been completed. If user input has been completed, the process in S410 is finished and the entire process proceeds to S411.

After the format automatic judgment and the setting of the destination application folder in S410, the reading/sending control section 249 judges whether the readout of the document has been completed (S411). If not completed, the next page of the document is read out (S412) and the process in S411 is repeated.

If it is judged in S411 that the readout of the document has been completed, the reading/sending control section 249 sends the scan data to the destination application folder which has been registered in S410 (S908) to the destination storage section 243 (S413), and finishes the process.

(2-3) Fetching Step

The following will describe the fetching step which is the third step. FIG. 11 is a flowchart showing the flow of processes in the client PC 104 in the fetching step. It is noted that, although the following deals with the fetching step in the client PC 104, similar processes are performed in the client PC 105.

The operation control section 211 of the client PC 104 causes the application folder monitor sections to monitor whether data is stored in application folders which are below the client PC 1 folder of the station PC 103 and are monitoring targets of the respective monitor sections (S1101). In other words, the application 1 folder monitor section 212 monitors if data is stored in the application 1 folder 235, whereas the application 2 folder monitor section 213 monitors if data is stored in the application 2 folder 236. The application folder monitor sections may be parts of respective applications software. In other words, each applications software may have a function to monitor the application folder which is registered to the station PC and associated with the application software.

The operation control section 211 then causes each application folder monitor section to judge whether data is stored in the application folder monitored by the application folder monitor section (i.e. whether new data has been stored) (S1102). The judgment may be performed at predetermined intervals (i.e. regularly), or may be performed when the client PC 104 is powered or the application corresponding to the application folder monitor section is activated.

If it is judged in S1102 that data is not stored in the application folder, the application folder monitor section repeats the monitoring from S1101.

On the other hand, if it is judged in S1102 that data is stored in the application folder, the operation control section 211 fetches the data from that application folder of the station PC 103 and stores it in the application data folder of the associated client PC 104 (S1103). In other words, the data is moved from the application folder of the station PC 103 to the application data folder of the client PC 104. In doing so, for example, the operation control section 211 sends, to the station PC 103, a request to transfer the data, and receives and fetches the data from the station PC 103.

Thereafter, the operation control section 211 judges whether the fetching and storing of the data has been completed (S1104). If not completed, the process in S1103 is repeated.

If it is judged in S1104 that the fetching and storing of the data has been completed, the operation control section 211 causes the application software associated with the application data folder in which the data is stored to perform analysis of the data (S1105), and finishes the entire process.

In the present embodiment, update of data in an application data folder of the client PC 104 is defined as a trigger to start an analysis process (e.g. image processing) by an application software. On this account, execution of an application software in S1105 is not performed by a manual operation of the user but automatically performed by the application software. In other words, the process by the application software is carried out without requiring the user to actually activate or operate the application software.

For example, in case where scan data of a document with the business card format is stored in the application data folder specified by the application software "Business card filing ΔΔΔ" which is used for generating a database of business card information, the application software "Business card filing ΔΔΔ" adds the business card information of the scan data to the database. That is, the operation control section 211 executes the application software "Business card filing ΔΔΔ" so as to add the business card information to the database. A method of reading out and recognizing business card information from scan data is, for example, disclosed in the patent documents 3 and 4. FIG. 13 shows an example of the database of business card information generated by the application software "Business card filing ΔΔΔ".

Similarly, in case where scan data of a document with the English resume format is stored in the application folder specified by the application software "Translation engine ooo" which is used for performing English-Japanese translation of an English resume, the "Translation engine ooo" performs English-Japanese translation of the English resume indicated by the scan data. That is, the operation control section 211 executes the application software "Translation engine ooo" so that English-Japanese translation of the English resume is performed. FIG. 14 shows an example of a Japanese resume created as a result of English-Japanese translation by the application software "Translation engine ooo".

The present embodiment mainly deals with a case where the application folder monitor sections of the respective client PCs 104 and 105 monitor the application folders of the station PC 103. The present invention, however, is not limited to this case. For example, as indicated by a chain line in FIG. 2, the monitor section 251 monitoring application folders of the station PC 103 and the image sending section 205 sending scan data to the client PCs may be provided in the station PC 103, and data may be automatically transferred from the station PC 103 to the client PCs.

FIG. 12 is a flowchart showing the flow of processes in the station PC 103, in case where scan data is fetched by (transferred to) a client PC by the automatic transfer.

The operation control section 231 of the station PC 103 causes the monitor section 251 to monitor to which application folders registered (made) below each client PC folder the data is stored (S1201).

The operation control section 231 then causes the monitor section 251 to judge whether the data is stored in any one of the registered application folders (i.e. whether new data has been stored) (S1202). This judgment may be performed at predetermined intervals (i.e. performed regularly).

If it is judged in S1202 that the data is not stored in any one of application folders, the monitor section 251 repeats the monitoring from S1201.

On the other hand, if it is judged in S1202 that the data is stored in any one of the application folders, the operation control section 231 causes the image sending section 250 to send (transfer) the data stored in the application folder to the application data folder of the client PC, which folder corresponds to the application folder and the client PC folder above the application folder (S1203). In other words, the image sending section 250 acquires the path of the corresponding application data folder of the client PC, with reference to the registration information, and sends the data thereto.

The operation control section 231 then judges whether transfer of the data has been finished (S1204). If not, the process in S1203 is repeated.

If it is judged in S1204 that transfer of the data has been finished, the operation control section 231 finishes the entire process.

As discussed above, in the present embodiment, update of data in an application data folder of the client PC 104 is defined as a trigger to start an analysis process (e.g. image processing) by an application software. On this account, even when the automatic transfer is adopted, the process by the application software is automatically performed because the data is transferred to the application data folder of the client PC, and hence the user is not requested to manually operate the application software.

As described above, in the network scanner system of the present embodiment, the station PC 103 generates, in the storage section 233, an application folder which is associated with a client PC and an application software of the client PC. Scan data stored in the application folder is moved to an application data folder which is provided to correspond to the client PC and application software associated with the application folder.

With this, the scan data read out by the scanner apparatus 101 can be moved to the application data folder associated with the client PC and application software which are selected to perform data processing with respect to the scan data, by only storing the scan data in, among application folders registered to the station PC 103, an application folder associated with the aforesaid client PC and application software. It is therefore possible to efficiently store scan data read out by the scanner apparatus 101 and to perform data processing by an application software with respect to the scan data. The level of convenience is therefore increased for the user.

The blocks in the client PCs 104 and 105, the station PC 103, and the scanner apparatus 101, the operation control sections 211, 221, and 223, the application folder monitor sections 212, 213, 222, and 223, the hierarchical folder sending section 232, the image sending section 250, the monitor section 251, and the control section 245 in particular, are realized by software, with the use of a processor such as CPU.

That is, the client PCs 104 and 105, the station PC 103, and the scanner apparatus 101 may include members such as: a CPU (Central Processing Unit) that executes instructions of a control program realizing the functions; a ROM (Read Only Memory) recording the program; a RAM (Random Access Memory) on which the program is executed; and a storage device (recording medium) such as a memory, which stores the program and various kinds of data. The objective of the present invention can be achieved in the following manner: program code (e.g. an executable code program, intermediate code program, and source program) of the control program of the client PCs 104 and 105, the station PC 103, and the scanner apparatus 101, the control program being software for realizing the functions, is recorded on a recording medium in a computer-readable manner, this recording medium is supplied to the client PCs 104 and 105, the station PC 103, and the scanner apparatus 101, and the computer (or CPU or MPU) reads out the program code from the recording medium and execute the program.

Examples of such a recording medium include a tape, such as a magnetic tape and a cassette tape; a magnetic disk, such as a flexible disk and a hard disk; a disc including an optical disc, such as a CD-ROM/MO/MD/DVD/CD-R; a card, such as an IC card (inclusive of a memory card); and a semiconductor memory, such as a mask ROM, an EPROM (Erasable Programmable Read Only Memory), an EEPROM (Electrically Erasable Programmable Read Only Memory), or a flash ROM.

Alternatively, the client PCs 104 and 105, the station PC 103, and the scanner apparatus 101 may be capable of being connected to a communications network, allowing the program code to be supplied via the communications network. Non-limiting examples of the communications network include the Internet, intranet, extranet, LAN, ISDN, VAN CATV network, virtual private network, telephone network, mobile communications network, and satellite communications network. Non-limiting examples of the transmission media composing the communications network are, wired media such as IEEE1394, USB, power line communication, cable TV lines, telephone lines, and ADSL lines, infrared light such as IrDA and remote controller, electric waves such as Bluetooth®, IEEE802.11, HDR, mobile telephone network, satellite connection, and terrestrial digital broadcasting network. It is also noted the present invention may be realized by a carrier wave or as data signal sequence, which are realized by electronic transmission of the program code.

Alternatively, the blocks in the client PCs 104 and 105, the station PC 103, and the scanner apparatus 101 may be realized by hardware logic.

The image readout system of the present invention includes: an image readout apparatus reading out an image from a document so as to generate scan data; a server apparatus storing the scan data; and at least one terminal apparatus acquiring the scan data from the server apparatus, said at least one terminal apparatus having at least one application software by which data processing is performed with respect to data stored in a particular folder of a storage section of said at least one terminal apparatus, the server apparatus including server control means for generating, in a server storage section of the server apparatus, at least one application folder which is associated with said at least one terminal apparatus and said at least one application software of said at least one terminal apparatus.

According to the arrangement above, there is server control means which generates, in the server storage section, an application folder associated with a terminal apparatus and an application software of the terminal apparatus. This makes it possible to specify which terminal apparatus and application software should perform data processing to the scan data, only by selecting the destination for storing the scan data from the application folders in the server storage section. As a result, the user can find the destination for storing the scan data with a simpler procedure, and hence the level of convenience is increased for the user.

In addition to the above, it may be arranged so that additionally there is transfer means for moving the scan data stored in said at least one application folder to the particular folder corresponding to said at least one terminal apparatus and said at least one application software associated with said at least one application folder.

According to this embodiment, the transfer means moves the scan data stored in the application folder to the particular folder corresponding to the terminal apparatus and application software associated with the application folder. As a result, the scan data read out by the image readout apparatus is moved to the particular folder associated with the terminal apparatus and application software that should perform data processing with respect to the scan data, only by storing the scan data in the application folder associated with the terminal apparatus and application software that should perform data processing with respect to the scan data, among application folders in the server storage section. As a result, scan data read out by the image readout apparatus is efficiently stored and data processing to the scan data by an application software is efficiently performed, and hence the level of convenience is increased for the user.

In addition to the above, it may be arranged so that additionally there is monitor means for monitoring whether the scan data is stored in said at least one application folder, the transfer means moving the scan data to the particular folder, when the monitor means recognizes that the scan data is stored in said at least one application folder.

According to the arrangement above, whether the scan data is stored in the application folder is monitored, and the scan data is moved to the particular folder when it is detected that the scan data is stored in the application folder. Therefore, since the user is not required to manually move the scan data from the server apparatus to the terminal apparatus, the level of convenience is increased for the user.

It may be arranged so that the monitor means and the transfer means are provided in said at least one terminal apparatus. Also, it may be arranged so that the monitor means and the transfer means are provided in the server apparatus.

It may be arranged so that said at least one terminal apparatus includes registration information notifying means for sending, to the server apparatus, registration information including identification information of said at least one terminal apparatus and identification information of said at least one application software of said at least one terminal apparatus, and the server control means generates said at least one application folder in the server storage means, with reference to the registration information.

According to the arrangement above, the registration information including the identification information of the terminal apparatus and the identification information of the application software desired to be registered to the server apparatus is supplied from the terminal apparatus to the server apparatus, so that the application folder associated with the terminal apparatus and the application software is generated in the server storage section. In other words, it is possible to register, to the server apparatus, the terminal apparatus and its application software, by sending the registration information including the sets of identification information from the terminal apparatus to the server apparatus.

It may be arranged so that the registration information notifying means sends, to the server apparatus, format information of scan data which is processable by said at least one application software, and the server control means stores the format information in the server storage section, in association with the registration information.

According to the arrangement above, the format information of the scan data that the application software is processable is sent to the server apparatus, and the format information is stored in the server storage section, in association with the sets of identification information.

It may be arranged so that the server control means sends, to the image readout apparatus, identification information of said at least one terminal apparatus and identification information of said at least one application software, and the image readout apparatus includes: display means for displaying an image for specifying said at least one terminal apparatus and said at least one application software associated with said at least one application folder, with reference to the sets of identification information; and instruction input means for receiving an instruction for selecting one of said at least one application folder, in which the scan data is to be stored.

According to this arrangement, an image for specifying the terminal apparatus and the application software associated with the application folder in the server apparatus is displayed by the display means, so that an instruction from the user for selecting which application folder the scan data is stored is receivable. Also, the user can grasp the terminal apparatuses and applications software registered to the server apparatus, and hence the user can easily select desired terminal apparatus and application software, among the registered terminal apparatuses and applications software.

It may be arranged so that the server control means sends, to the image readout apparatus, format information of scan data which is processable by said at least one application software.

According to this arrangement, the format information of the scan data that the application software can process is sent to the image readout apparatus. The image readout apparatus or the user of the image readout apparatus can therefore refers to this format information at the time of selecting an application software by which data processing to the scan data is to be carried out. The server control means may send the format information of the scan data that the application software can process, each time the image readout is performed. Alternatively, the image readout apparatus may store the supplied format information in the storage means, and reads out and uses the stored format information at the time of image readout. In this case, the server control means may, for example, send format information to the image readout apparatus each time new format information is registered, or may regularly send registered format information to the image readout apparatus. After sending of format information to the image readout apparatus, the format information which has been sent may be deleted from the storage means of the server apparatus.

It may be arranged so that the image readout apparatus includes extraction means for extracting at least one application software which is able to process scan data read out from a document, from said at least one application software associated with said at least one application folder of the server apparatus, the extraction means extracting said at least one application software with reference to the format information.

According to this arrangement, with reference to the format information, the extraction means extracts applications software which can process the scan data read out from the document, among the applications software associated with the application folder of the server apparatus. As a result, the user can select an application software by which data processing is to be performed to the scan data read out from the document, with a simpler procedure.

It may be arranged so that the display means displays information for specifying said at least one application software extracted by the extraction means and at least one terminal apparatus including said at least one application software extracted by the extraction means.

According to this arrangement, the user can select a terminal apparatus and application software by which data processing is to be performed to the scan data, among the extracted applications software and the terminal apparatuses having those applications software. The level of convenience for the user is therefore increased as compared to a case where the user must perform selection from all terminal apparatuses and applications software registered in the server storage section.

It may be arranged so that the server control means notifies the image readout apparatus of an address of the selected application folder, and the image readout apparatus includes sending means for sending the scan data to the address of the selected application folder corresponding to the instruction received by the input means.

According to this arrangement, the user can store scan data in a desired application folder only by selecting the desired application folder. Since the user is not required to find the application folder to which the scan data is sent, the level of convenience is further increased for the user.

It may be arranged so that said at least one terminal apparatus includes terminal control means for causing said at least one application software corresponding to the particular folder to start data processing, when the scan data is stored in the particular folder.

According to this arrangement, when the scan data is stored in the particular folder, data processing by the application software corresponding to the particular folder is automatically started. Since the user is not required to activate the application software and input an instruction to start the data processing, the level of convenience for the user is increased.

It may be arranged so that the server apparatus is integrated with the image readout apparatus. In other words, the image readout apparatus may be able to perform at least one of the functions of the server apparatus. For example, in the arrangement above, the format information is sent from the server apparatus to the image readout apparatus each time the image readout is performed. Alternatively, the format information may be stored in the image readout apparatus, and an application software which can process the scan data read out from the document may be extracted based on the stored format information, at the time of image readout.

A server apparatus of the present invention, in an image readout system including: an image readout apparatus reading out an image from a document so as to generate scan data; the server apparatus storing the scan data; and at least one terminal apparatus acquiring the scan data from the server apparatus, said at least one terminal apparatus having at least one application software by which data processing is performed with respect to data stored in a particular folder, includes server control means for generating, in a server storage section of the server apparatus, at least one application folder which is associated with said at least one terminal apparatus and said at least one application software of said at least one terminal apparatus.

According to this arrangement, there is server control means which generates, in the server storage section, an application folder associated with a terminal apparatus and an application software of the terminal apparatus. This makes it possible to specify which terminal apparatus and application software should perform data processing to the scan data, only by selecting the destination for storing the scan data from the application folders in the server storage section. As a result, the user can find the destination for storing the scan data with a simpler procedure, and hence the level of convenience is increased for the user.

It may be arranged so that additionally there is transfer means for moving the scan data stored in said at least one application folder to the particular folder corresponding to said at least one terminal apparatus and said at least one application software which are associated with said at least one application folder.

According to this arrangement, the transfer means moves the scan data stored in the application folder to the particular folder corresponding to the terminal apparatus and application software associated with the application folder. As a result, the scan data read out by the image readout apparatus is moved to the particular folder corresponding to the terminal apparatus and application software by which the scan data is to be processed, only by being stored in the application folder associated with the terminal apparatus and application software by which the scan data is to be processed, among the application folders in the server storage section. It is therefore possible to efficiently store scan data read out by the image readout apparatus and to efficiently perform data processing by an application software with respect to the scan data. The level of convenience is therefore increased for the user.

It may be arranged so that additionally there is monitor means for monitoring whether the scan data is stored in said at least one application folder, the transfer means moving the scan data to the particular folder, when the monitor means recognizes that the scan data is stored in said at least one application folder.

According to this arrangement, the monitor means monitors if the scan data is stored in the application folder, and the scan data is moved to the particular folder when it is detected that the scan data is stored.

It may be arranged so that the server control means acquires, from said at least one terminal apparatus, registration information including identification information of said at least one terminal apparatus and identification information of said at least one application software of said at least one terminal apparatus, and generates said at least one application folder in the server storage section with reference to the registration information.

According to this arrangement, the server control means can generate an application folder with reference to the registration information supplied from the terminal apparatus.

It may be arranged so that the server control means acquires, from said at least one terminal apparatus, format information of scan data which is processable by said at least one application software, and stores the format information in the server storage section, in association with the registration information.

According to this arrangement, the format information of the scan data processable by the application software is sent to the server apparatus, and this format information is stored in the server storage section, in association with the sets of identification information.

It may be arranged so that the server control means sends, to the image readout apparatus, the identification information of said at least one apparatus and the identification information of said at least one application software, said at least one apparatus and said at least one application software being associated with said at least one application folder of the server storage section.

According to this arrangement, the server control means sends, to the image readout apparatus, the sets of identification information of the terminal apparatus and the application software which are associated with the application folder. As a result of this, for example, information for specifying the terminal apparatus and application software associated with the application folder in the server apparatus is displayed on the display means of the image readout apparatus. This helps the user to select an application folder to which the scan data is to be stored, and hence the level of convenience is increased for the user.

It may be arranged so that the server control means notifies the image readout apparatus of an address of said at least one application folder.

According to this arrangement, the server control means notifies the image readout apparatus of an address of the application folder. As a result of this, for example, the address of the application folder is registered to the image readout apparatus, and the scan data is automatically sent to the application folder selected by the user. Since the user is not required to find the application folder to which the scan data is to be sent, the level of convenience is further increased for the user.

It may be arranged so that the server control means sends, to the image readout means, the format information of the scan data processable by said at least one application software.

According to this arrangement, the format information of the scan data processable by the application software is sent to the image readout apparatus. The image readout apparatus or the user of the image readout apparatus can therefore refers to this format information and selects an application software by which data processing to the scan data is to be performed.

An image readout apparatus of the present invention, in an image readout system including: the image readout apparatus reading out an image from a document so as to generate scan data; a server apparatus storing the scan data; and at least one terminal apparatus acquiring the scan data from the server apparatus, said at least one terminal apparatus having at least one application software by which data processing is performed with respect to data stored in a particular folder, includes: display means for displaying an image for specifying a terminal apparatus and an application software associated with at least one application folder in the server apparatus, with reference to identification information of said at least one terminal apparatus and identification information of said at least one application software, the sets of identification information being acquired from the server apparatus; and instruction input means for receiving an instruction for selecting one of said at least one application folder, to which the scan data is to be stored.

According to this arrangement, the display means displays an image for specifying a terminal apparatus and an application software associated with the application folder, with reference to the identification information of the terminal apparatus and the identification information of the application software, the terminal apparatus and the application software being associated with the application folder. The instruction input means then receives an instruction of the user for selecting which application folder the scan data is stored. This allows the user to grasp the application folders in the server apparatus, i.e. the terminal apparatuses and applications software registered in the server apparatus, and to easily select a desirable terminal apparatus and application software, from the registered terminal apparatuses and applications software.

It may be arranged so that additionally there is extraction means for extracting, with reference to format information of scan data processable by said at least one application software, at least one application software which is able to process scan data read out from a document, from said at least one application software associated with said at least one application folder of the server apparatus, the format information being acquired from the server apparatus.

According to this arrangement, with reference to the format information, the extraction means extracts applications software that can perform data processing to the scan data read out from the document, from the applications software associated with the application folder in the server apparatus. This simplifies the user's operation to select an application software by which the scan data read out from the document is to be processed.

It may be arranged so that the display means displays information for specifying (i) said at least one application software extracted by the extraction means and (ii) at least one terminal apparatus including said at least one application software extracted by the extraction means.

According to this arrangement, the user can select, from the extracted applications software and the terminal apparatuses having the same, an application software and terminal apparatus by which data processing to the scan data is to be performed. This increases the level of convenience for the user, as compared to a case where selection is made from all terminal apparatuses and applications software registered in the server storage section.

It may be arranged so that the image readout apparatus includes the server apparatus. In other words, the image readout apparatus may perform the functions of the server apparatus.

At least one terminal apparatus of the present invention, in an image readout system including: an image readout apparatus reading out an image from a document so as to generate scan data; a server apparatus storing the scan data; and said at least one terminal apparatus acquiring the scan data from the server apparatus, said at least one terminal apparatus having at least one application software by which data processing is performed with respect to data stored in a particular folder, includes registration information notifying means for sending, to the server apparatus, registration information including identification information of said at least one terminal apparatus and identification information of said at least one application software of said at least one terminal apparatus.

According to the arrangement above, registration information including identification information of a terminal apparatus and identification information of an application software desired to be registered in the server apparatus is sent from the terminal apparatus to the server apparatus, so that the server apparatus can generate, in the server storage section of the server apparatus, an application folder associated with the terminal apparatus and the application software. In other words, it is possible to register, in the server apparatus, a terminal apparatus and an application software of the terminal apparatus, by sending registration information including the sets of identification information from the terminal apparatus to the server apparatus.

It may be arranged so that the registration information notifying means sends, to the server apparatus, format information of scan data processable by said at least one application software.

According to this arrangement, the format information of the scan data processable by the application software is sent to the server apparatus. This allows the server apparatus to store the format information in the server storage section, in association with the sets of identification information.

It may be arranged so that additionally there is transfer means for moving, to the particular folder, the scan data stored in at least one application folder of the server apparatus, in association with the sets of identification information.

According to this arrangement, the transfer means moves the scan data stored in the application folder to the particular folder corresponding to the application software associated with the application folder. As a result, the scan data read out by the image readout apparatus is moved to the particular folder corresponding to the terminal apparatus and application software by which the scan data is to be processed, only by being stored in the application folder associated with the terminal apparatus and application software by which the scan data is to be processed, among the application folders in the server storage section. It is therefore possible to efficiently store scan data read out by the image readout apparatus and to efficiently perform data processing by an application software with respect to the scan data.

It may be arranged so that additionally there is monitor means for monitoring whether the scan data is stored in said at least one application folder, the transfer means moving the scan data to the particular folder, when the monitor means recognizes that the scan data is stored in said at least one application folder.

According to this arrangement, the monitor means monitors whether the scan data is stored in the application folder, and the scan data is moved to the particular folder when it is detected that the scan data is stored.

It may be arranged so that additionally there is terminal control means for causing said at least one application software corresponding to the particular folder to start data processing, when the scan data is stored in the particular folder.

According to this arrangement, when the scan data is stored in the particular folder, data processing by the application software corresponding to the particular folder is automatically started. Since the user is not required to activate the application software and input an instruction to start the data processing, the level of convenience for the user is increased.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image readout system, comprising:
    an image readout apparatus reading out an image from a document so as to generate scan data;
    a server apparatus storing the scan data; and
    multiple terminal apparatuses acquiring scan data from the server apparatus,
    each of said multiple terminal apparatuses having
        (i) multiple application software by which data processing is performed with respect to the scan data, and (ii) a particular folder or particular folders provided respectively for at least one of said multiple application software in a storage section thereof each of said multiple terminal apparatuses including:
        registration information notifying means for sending, to the server apparatus, registration information including (i) identification information of itself and
        (ii) identification information of
            at least one of the multiple application software associated with each of the multiple terminal apparatuses, in addition to formats of a document which are processable by each of the multiple application software, and
        a terminal controlling section for controlling, in a case where scan data is stored in a particular folder among the particular folder or particular folders, that application software among the multiple application software which corresponds to the particular folder, the terminal controlling section controlling said that application software to automatically start data processing, and
    the server apparatus including:

server control means for
(i) controlling a server storage section of the server apparatus to store the formats of the document with respect to which the data processing can be performed by at least one of the multiple application software of the respective terminal apparatuses, and
(ii) generating, in the server storage section, an application folder which is associated with (a) a selected one of the multiple terminal apparatuses, and (b) a selected one of the multiple application software associated with the selected terminal apparatus, and the image readout apparatus including:
a document format recognizing section for automatically determining the formats of the document by analyzing a layout of the document on the basis of the scan data;
a readout transmission controlling section for
(i) extracting, according to a result of the automatic determination by the document format recognizing section, at least one of the multiple application software from the application software respectively corresponding to each application folder generated in the server storage section, the at least one of the multiple application software being capable of performing data processing with respect to the document, and
(ii) controlling a display section to display a list of the at least one of the multiple application software thus extracted; and
an operation section for receiving a first selection instruction, from a user, for selecting, from the list of the at least one of the multiple application software displayed on the display section, application software by which data processing is to be performed with respect to the scan data,
the readout transmission controlling section (i) controlling the display section to display a list of a plurality of the multiple terminal apparatuses in a case where there are a plurality of terminal apparatuses having the application software selected according to the first selection instruction, (ii) receiving a second selection instruction, which is entered by a user via the operation section, for selecting, from the list of the plurality of the multiple terminal apparatuses which is displayed on the display section, a terminal apparatus for processing the scan data, and (iii) controlling an application folder generated in the server storage section to store the scan data, which application folder corresponds to (a) the terminal apparatus selected according to the second selection instruction, and (b) the application software selected according to the first selection instruction, and the server apparatus including:
a monitor section for monitoring each application folder for the presence of scan data therein; and
a transfer section for, in the case where the monitor section detects stored scan data in an application folder, moving the scan data to the particular folder provided in the terminal apparatus corresponding to the application folder, which particular folder corresponds to the application folder.

2. The image readout system as defined in claim 1, wherein, the sever control means sends, to the image readout apparatus, identification information of at least one of said multiple terminal apparatuses which is associated with at least one application folder provided in the server storage section and identification information of at least one of said multiple application software which is associated with said at least one application folder provided in the sever storage section, and the image readout apparatus further includes:
display means for displaying an image for specifying said at least one of said multiple terminal apparatuses and at least one of said multiple application software associated with said at least one application folder, with reference to corresponding registration information; and
instruction input means for receiving an instruction for selecting one of said at least one application folder, in which the scan data is to be stored.

3. The image readout system as defined in claim 2, wherein, the server control means sends, to the image readout apparatus, format information of data which is processable by said at least one of said multiple application software.

4. The image readout system as defined in claim 2, wherein, the server control means notifies the image readout apparatus of an address of the selected application folder, and
the readout transmission controlling section sends the scan data to the address of the selected application folder corresponding to
(a) the terminal apparatus selected according to the second selection instruction, and (b) the application software selected according to the first selection instruction.

5. The image readout system as defined in claim 1, wherein, the server apparatus is integrated with the image readout apparatus.

6. The image readout system as set forth in claim 1, wherein: said multiple application software includes at least one of (i) an application software for generating a database of business card information on the basis of scan data in which a document format is a business card format, and (ii) an application software for performing a translation process with respect to text of the document on the basis of scan data in which the document format is a resume format.

7. A server apparatus in an image readout system wherein
an image readout apparatus reads out an image from a document so as to generate scan data having a scan data format;
a server apparatus stores the scan data; and
at least one of multiple terminal apparatuses acquires the scan data from the server apparatus,
each of said at least one of multiple terminal apparatuses has (i) multiple application software by which data processing is performed with respect to the scan data, and (ii) a particular folder or particular folders is/are provided respectively for said multiple application software in a storage section of said at least one of multiple terminal apparatuses,
each of said multiple terminal apparatuses includes:
registration information notifying means for sending, to the server apparatus, registration information including (i) identification information of a selected one of the multiple terminal apparatuses, and (ii) identification information of the at least one of the multiple application software of the selected one of the multiple terminal apparatuses, in addition to formats of a document which are processable by each of the at least one of the multiple application software, and a terminal controlling section for controlling, in a case where scan data is stored in a particular folder or particular folders, that application software among the at least one of the multiple application software which corresponds to the particular folder, the terminal controlling section controlling that application software to automatically start data processing, and the server apparatus includes:
(a) server control means for
  (i) controlling a server storage section of the server apparatus to store the formats of the document with respect to which data processing can be performed by the multiple application software of the multiple terminal apparatuses, and (ii) generating, in the server storage section an application folder which is associated with (a) a selected one of the multiple terminal apparatuses, and (b) the application software associated with the selected one of the multiple terminal apparatuses, and the image readout apparatus includes:
  a document format recognizing section for automatically determining the formats of the document by analyzing a layout of the document on the basis of the scan data;
  a readout transmission controlling section for (i) extracting, according to a result of the automatic determination by the document format recognizing section, at least one application software from those of the multiple application software respectively corresponding to each application folder generated in the server storage section, said at least one application software being capable of performing data processing with respect to the document, and (ii) controlling a display section to display a list of the application software thus extracted; and
  an operation section for receiving a first selection instruction, from a user, for selecting, from the list of the extracted application software displayed on the display section, application software by which data processing is to be performed with respect to the scan data,
  the readout transmission controlling section (i) controls the display section to display a list of a plurality of terminal apparatuses in a case where there are a plurality of terminal apparatuses having the application software selected according to the first selection instruction, (ii) receives a second selection instruction, which is entered by a user via the operation section, for selecting, from the list of the plurality of terminal apparatuses which is displayed on the display section, a terminal apparatus for processing the scan data, and (iii) controls an application folder generated in the server storage section to store the scan data, which application folder corresponds to (a) the terminal apparatus selected according to the second selection instruction, and (b) the application software selected according to the first selection instruction, and the server apparatus includes:
  a monitor section for monitoring each application folder for the presence of scan data therein; and
  a transfer section for, in the case where the monitor section detects stored scan data in the application folder, moving the scan data to a particular folder provided in the terminal apparatus corresponding to the application folder, which particular folder corresponds to the application folder.

8. The server apparatus as defined in claim 7, wherein, the server control means sends, to the image readout apparatus, identification information of at least one of the multiple terminal apparatuses and the identification information of at least one of the multiple application software, and said at least one of the multiple terminal apparatuses and said at least one of the multiple application software are associated with at least one application folder of the server storage section.

9. The server apparatus as defined in claim 8, wherein, the server control means sends, to the image readout means, format information of data processable by said at least one of the multiple application software.

10. The server apparatus as defined in claim 8, wherein, the server control means notifies the image readout apparatus of an address of said at least one application folder.

11. An image readout apparatus in an image readout system wherein an image readout apparatus reads out an image from a document so as to generate scan data having a scan data format;

a server apparatus stores the scan data; and multiple terminal apparatuses acquire the scan data from the server apparatus, each of the multiple terminal apparatuses has (i) multiple application software by which data processing is performed with respect to the scan data and (ii) a particular folder or particular folders provided respectively for said multiple application software in storage sections of said multiple terminal apparatuses, each of said multiple terminal apparatuses includes registration information notifying means for sending, to the server apparatus, registration information including (i) identification information of itself and (ii) identification information of the multiple application software associated with each of the multiple terminal apparatuses, in addition to formats of a document which are processable by each of the multiple application software, and a terminal controlling section for controlling, in a case where scan data is stored in a particular folder among the particular folder or particular folders, that application software among the at least one multiple application software which corresponds to the particular folder, the terminal controlling section controlling that application software to automatically start data processing, and the server apparatus includes:
  server control means for (i) controlling a server storage section of the server apparatus to store the formats of the document with respect to which the data processing can be performed by the multiple application software of the multiple terminal apparatuses and (ii) generating, in a the server storage section, an application folder which is associated with (a) a selected one of the multiple terminal apparatuses and (b) the application software of the selected one of the multiple terminal apparatuses, and the image readout apparatus includes:
  a document format recognizing section for automatically determining the formats of the document by analyzing a layout of the document on the basis of the scan data;
  a readout transmission controlling section for (i) extracting, according to a result of the automatic determination by the document format recognizing section, at least one of the multiple application software from the application software respectively corresponding to each application folder generated in the server storage section, the at least one of the multiple application software being capable of performing data processing with respect to the document, and (ii) controlling a display section to display a list of the at least one of the multiple application software thus extracted; and an operation section for receiving a first selection instruction, from a user, for selecting, from the list of the at least one multiple application software displayed on the display section, application software by which data processing is to be performed with respect to the scan data, the readout transmission controlling section (i) controlling the display section to display a list of a plurality of the multiple terminal apparatuses in a case where there are a plurality of terminal apparatuses having the application software selected according to the first selection instruction, (ii) receiving a second selection instruction, which is entered by a user via the operation section, for selecting, from the list of the plurality of terminal apparatuses which is displayed on the display section, a terminal for processing the scan data, and (iii) controlling an application folder generated in the server storage section to store the scan data, which application folder corresponds to (a) the terminal apparatus selected according to the second selection instruction, and (b) the application software selected according to the first selection instruction, and the server apparatus including:
  a monitor section for monitoring each application folder for the presence of scan data therein; and
  a transfer section for, in the case where the monitor section detects scan data stored in the application folder, moving the scan data to a particular folder provided in the terminal apparatus corresponding to the application folder, which particular folder corresponds to the application folder.

12. At least one terminal apparatus in an image readout system wherein
  an image readout apparatus reads out an image from a document so as to generate scan data having a scan format;
  a server apparatus stores the scan data; and
  multiple terminal apparatuses acquire the scan data from the server apparatus,
  each of said multiple terminal apparatuses has (i) at least one of multiple application software by which data processing is performed with respect to the scan data, and (ii) a particular folder or particular folders provided respectively for storing said application software in a storage section thereof,
  each of said terminal apparatuses includes:
    registration information notifying means for sending, to the server apparatus, registration information including (i) identification information of the multiple application software thereof, in addition to formats of a document which is processable by each of said multiple application software thereof; and
    a terminal controlling section for controlling, in a case where scan data is stored in a particular folder among the particular folder or particular folders, that application software among at least one application of the multiple application software which corresponds to the particular folder, the terminal controlling section controlling that application software to automatically start data processing, and
  the server apparatus includes:
    server control means for (i) controlling a server storage section of the server apparatus to store the formats of the document with respect to which the data processing can be performed by the application software of a selected terminal apparatus and (ii) generating in the server storage section an application folder which is associated with (a) the selected terminal apparatus and (b) the application software of the selected terminal apparatus, and
    (ii) identification information of the at least one multiple application software of the associated with each of the multiple terminal apparatuses apparatus, in addition to formats of a document which are processable by each of the at least one multiple application software, and
  the image readout apparatus includes:
    a document format recognizing section for automatically determining the formats of the document by analyzing a layout of the document on the basis of the scan data;
  a readout transmission controlling section for (i) extracting, according to a result of the automatic determination by the document format recognizing section, at least one of the multiple application software from the multiple application software respectively corresponding to each application folder generated in the server storage section, the at least one of the multiple application software being capable of performing data processing with respect to the document, and (ii) controlling a display section to display a list of the at least one of the multiple application software thus extracted; and
  an operation section for receiving a first selection instruction, from a user, for selecting, from the list of at least one of the multiple application software displayed on the display section, application software by which data processing is to be performed with respect to the scan data,
  the readout transmission controlling section (i) controlling the display section to display a list of a plurality of the multiple terminal apparatuses in a case where there are a plurality of terminal apparatuses having the application software selected according to the first selection instruction, (ii) receiving a second selection instruction, which is entered by a user via the operation section, for selecting, from the list of the plurality of terminal apparatuses which is displayed on the display section, a terminal for processing the scan data, and (iii) controlling an application folder generated in the server storage section to store the scan data, which application folder corresponds to (a) the terminal apparatus selected according to the second selection instruction, and (b) the application software selected according to the first selection and
  (ii) identification information of the multiple application software associated with each of the multiple terminal apparatuses , in addition to formats of a document which are processable by each of the multiple application software, and
  the server apparatus including:
    a monitor section for monitoring each application folder for the presence of scan data therein; and
    a transfer section for, in the case where the monitor section detects scan data stored in the application folder, moving the scan data to a particular folder provided in the terminal apparatus corresponding to that application folder, which particular folder corresponds to the application folder.

* * * * *